(12) United States Patent
McDaniel et al.

(10) Patent No.: US 8,867,728 B2
(45) Date of Patent: Oct. 21, 2014

(54) MANAGING RESERVE AGENTS IN A CONTACT CENTER

(71) Applicant: Noble Systems Corporation, Atlanta, GA (US)

(72) Inventors: Patrick McGuire McDaniel, Atlanta, GA (US); Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 13/713,625

(22) Filed: Dec. 13, 2012

(65) Prior Publication Data
US 2014/0169548 A1 Jun. 19, 2014

(51) Int. Cl.
H04M 3/00 (2006.01)
H04M 5/00 (2006.01)
H04M 3/51 (2006.01)

(52) U.S. Cl.
CPC .................................. *H04M 3/5175* (2013.01)
USPC .................................................... 379/265.01

(58) Field of Classification Search
USPC .................. 705/7.12, 7.13, 7.17; 379/265.01, 379/265.02, 265.05, 266.01, 266.02, 266.07
See application file for complete search history.

(56) References Cited

U.S. PATENT DOCUMENTS

| 6,430,597 | B1 * | 8/2002 | Dilip et al. ..................... 709/202 |
| 6,724,884 | B2 | 4/2004 | Jensen et al. |
| 8,219,430 | B1 | 7/2012 | Thompson et al. |
| 2005/0004828 | A1 | 1/2005 | deSilva et al. |
| 2005/0021384 | A1 * | 1/2005 | Pantaleo et al. ................... 705/9 |
| 2005/0096962 | A1 | 5/2005 | Narasimhan et al. |
| 2008/0027783 | A1 | 1/2008 | Hughes et al. |
| 2008/0255919 | A1 | 10/2008 | Gorder |
| 2009/0161849 | A1 * | 6/2009 | Minnich et al. .......... 379/112.01 |
| 2009/0292555 | A1 | 11/2009 | Brown |
| 2010/0088145 | A1 * | 4/2010 | Omiya .............................. 705/9 |
| 2010/0266116 | A1 | 10/2010 | Stolyar et al. |
| 2010/0324964 | A1 * | 12/2010 | Callanan et al. ................... 705/9 |

OTHER PUBLICATIONS

IEX Corporation, TotalView WebStation, Release 3.7, Document No. 1-602-660, Jun. 2004.*
Noble Systems Corporation, NobleWFM 2010.0.0 User Guide, Mar. 28, 2011, 324 pages, Atlanta, GA.
Noble Systems Corporation, ShiftTrack Plus User Manual 5.5.0, Jun. 2010.
Response to Office Action for U.S. Appl. No. 13/742,024, dated Jun. 19, 2013.

(Continued)

*Primary Examiner* — Oleg Asanbayev

(57) ABSTRACT

A reserve agent management system ("RAMS") allows a user, such as a contact center agent or administrator, to access and edit a reserve schedule. In one embodiment, the reserve schedule indicates times, called reserve times, during the agent's off-hours when the agent would be willing to receive a recall invitation and potentially return to work. When, during operation of the contact center, a determination is made that additional agent resources are needed, agents having compatible reserve times are notified and invited to be recalled. Agents responding and agreeing to be recalled are then recalled by being scheduled to work at certain recall times. In another embodiment, agent's break times can be shifted to potentially accommodate unexpected changes in the required agent resources. The RAMS allows administrators and agents a limited amount of flexibility in adapting agent work schedules to accommodate unplanned needs for agent resources.

14 Claims, 12 Drawing Sheets

(56) References Cited

OTHER PUBLICATIONS

Office Action for U.S. Appl. No. 13/742,024, May 31, 2013, 35 pages, USPTO.
Final Office Action received for U.S. Appl. No. 13/742,024 dated Jul. 26, 2013.
Amendment After Final, U.S. Appl. No. 13/742,024, dated Aug. 1, 2013.
Applicant Provided Interview Summary, U.S. Appl. No. 13/742,024, dated Aug. 30, 2013.
Pre-Appeal Brief, U.S. Appl. No. 13/742,024, dated Sep. 11, 2013.
Appeal Brief, U.S. Appl. No. 13/742,024, dated Oct. 2, 2013.
Reply Brief, U.S. Appl. No. 13/742,024, dated Dec. 18, 2013.
Advisory Action, U.S. Appl. No. 13/742,024, dated Sep. 9, 2013.
Examiner's Answer, U.S. Appl. No. 13/742,024, dated Nov. 18, 2013.
Pre-Appeal Brief Decision, U.S. Appl. No. 13/742,024, dated Oct. 9, 2013.

* cited by examiner

MANAGING RESERVE AGENTS IN A CONTACT CENTER

BACKGROUND

Contact centers may receive and/or originate communications, such as telephone calls, for various purposes. The volume of communications, such as inbound telephone calls, may vary based on the time of day, day of week, and time of year. To handle the anticipated volume of communications, forecasts may be produced and a staff of agents is scheduled accordingly. In order to ensure that agents are always available, the agents may be scheduled for various shifts, and typically the starting times may be staggered so that, for example, not all the agents are scheduled to take their lunch break at the same time. This also allows agents to have rest breaks scheduled at different times. To further provide flexibility in allocating agent resources, part-time as well as full-time agents may be employed.

These and other techniques may be available to a contact center in order to match the available agent resources with the anticipated call volumes. However, regardless of how effective these techniques may be employed, it is possible that at various times there will be a deficiency of agent resources. In some instances, there is a level of advanced knowledge that this will occur. For example, it can be expected that for various reasons, one or more agents may report sick and will be unable to work their scheduled shift, arrive late, or leave early. Or, after agents are scheduled, other circumstances may result in a change to anticipated call volume.

Similarly, both contact center administrators and agents expect, that at various times, events or circumstances will arise that make adherence to a work schedule difficult or impossible. Further, both administrators and agents desire some flexibility in order to accommodate such events, which sometimes can be foreseen in advance. Thus, it is desirable to have mechanisms that afford agents flexibility in their work schedules, and which offer administrators greater flexibility in allocating agent resources. It is further desirable that such mechanisms are easy to administer and facilitate servicing the anticipated communications.

BRIEF SUMMARY

In general, embodiments of the present invention provide computer program products, methods, systems, apparatus, and computing entities for defining a reserve schedule.

Specifically, in various embodiments, an agent may define a schedule of reserve times, called a reserve schedule, which indicates time periods outside the scheduled work times that the agent is willing to be recalled. A recalled agent is an agent who is invited to work during an indicated reserve time. Various mechanisms may be defined for a contact center to determine that there is a deficiency of agent resources, and the extent of this deficiency and when the agent resource deficiency exists. In one embodiment, a reserve agent management system determines which agents have corresponding reserve times indicated in the reserve schedule that could fulfill the agent deficiency, and they are invited to work during an indicated time.

In various embodiments, agents and/or contact center administrators are able to manage the reserve schedules, including viewing current reserve schedules, adding time, editing, or deleting indicated reserve time periods.

In various embodiments, various rules can be defined indicating how to select or prioritize a plurality of agents who are potentially eligible for filling the agent deficiency. Rules can be defined, but are not limited to, involving seniority, pay, previously assigned hours, etc.

In various embodiments, the reserve agent management system may also shift scheduled breaks in an attempt to meet the agent resource deficiency. This may further involve cancelling a training session, where the involved agent is instead allocated to process communications instead of engaging in training.

As is discussed in greater detail below, the subject matter disclosed herein may be implemented as a computer-controlled apparatus, a method, a computing system, or as an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
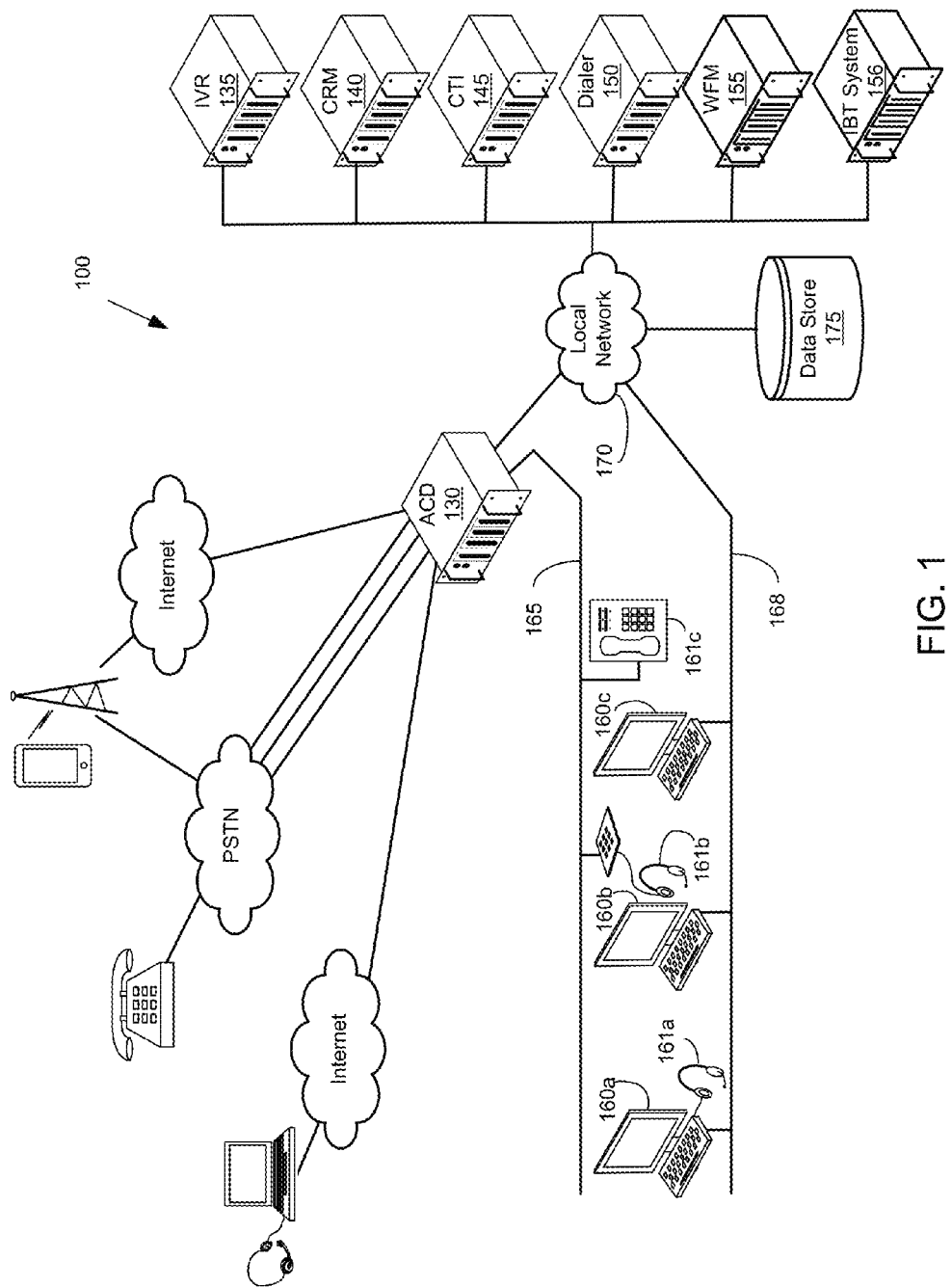
FIG. 1 shows an architecture of a contact center which may employ the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Contact Center Architecture

FIG. 1 shows one embodiment of a contact center architecture 100 illustrating the various technologies disclosed herein. The contact center architecture 100 shown in FIG. 1 may involve voice calls that originate from the contact center. Although many aspects of contact center operation are disclosed in the context of voice calls, in various embodiments, the contact center may process other forms of communication such as, for example, facsimiles, emails, text messages, video calls, and chat messages. That is, in various embodiments, a call center may be considered a form of contact center. However, for purposes of this disclosure, the term "contact center" is used throughout, although it is understood that the principles may apply to a call center (e.g., a center which only handles telephone calls).

In some embodiments, a contact center may employ a dialer 150, such as a predictive dialer, to originate outbound calls on behalf of an agent at a rate designed to meet various criterion. Similar to the other components within the contact center architecture 100, depending on the embodiment, the dialer 150 may comprise one or more software modules executing on a processing device hardware platform.

In various embodiments, outbound calls may originate from the dialer 150, which processes a dialing list comprising a collection of records retrieved from the data store 175. In one embodiment the data store 175 can be a database that stores the dialing list, and which contains other information on the targeted party. For example, each record may also include the targeted party's mailing or residential address. In certain embodiments, the data store 175 may be integrated with the dialer 150.

The dialing list may include hundreds or thousands of records, and these may not be sorted in any particular order, but may be dialed in sequence. Specifically, it is often the case that the records are not grouped together according to a particular destination or area code. One record may identify a targeted party in Maine, while the next record may identify a targeted party in Oregon.

The call originated by the dialer 150 may be directed to a targeted party at a computer, telephone or mobile device. The dialer will then connect that outgoing call to one of a plurality of contact center agents, if it has not already done so.

In various embodiments, the outgoing call may be connected over facilities 165 to an agent for servicing. That is, for example, the targeted party may speak with an agent to receive customer service. The physical area at which the agent sits is often referred to as an agent "position" and these positions are often grouped into clusters managed by a supervisor, who may monitor calls and the agents' productivity. An agent typically uses a computing device 160a-160c, such as a computer, and a voice device 161a-161c. The combination of computing device 160a-160c and voice device 161a-161c may be referred to as a "workstation." Thus, for these particular embodiments, the workstation collectively has a data capability and a voice capability, although separate devices may be used. In some instances, "workstation" may be used in reference to either the data or voice capability at the agent's position. For example, "routing the call to the agent's workstation" means routing a call to one of the voice devices 161a-161c at the agent's position. Similarly, "routing the call to the agent" means routing a call to the appropriate equipment at an agent's position.

The above components may be referred to as a "computing device," "processing device," or "system." This may incorporate a local data store 175 and/or interface with an external data store. Further, the above components may be located remotely from (or co-located with) other components. Furthermore, one or more of the components may be implemented on a single processing device to perform the functions described herein. For example, in various embodiments, the functionality of the dialer 150 may also be incorporated with other contact center components.

In addition, the contact center architecture 100 may be provided as a hosted solution, where the call processing functionality is provided as a communication service (a so-called "communication-as-a-service" or "CaaS") to a contact center operator. Thus, there is no requirement that the components identified above actually be located or controlled by a contact center operator.

In addition, depending on the embodiment, the agent positions may be co-located in a single physical contact center or multiple physical contact centers. The agents may be remotely located from the other components of the contact center, and may also be remotely located from each other, sometimes referred to as a "virtual contact center." In particular instances, a virtual contact center may describe a scenario in which agents work at home, using their own computers and telephones as workstations. In some configurations, a single physical location of the contact center may not be readily identifiable. For instance, this may occur when the call processing functions are provided as a service in a hosted cloud computing environment and the agents positions are in their individual residences.

Reserve Agent Service Concepts

The concepts and technologies disclosed herein generally involve a reserve agent management system ("RAMS") that can be used by a contact center to request or assign additional agent resources as needed. In some embodiments, the contact center may ascertain a need for such additional agent resources and request and/or reassign the agent resources. The determination that additional agent resources are needed, or need to be reassigned, at certain times can originate from a variety of other sources, including the agents themselves. If an insufficient number of agents are scheduled to handle the anticipated communications, then an agent resource deficiency may occur, and it is generally preferable to avoid an agent resource deficiency in such circumstances.

Although the concepts and technologies herein are illustrated using a contact center, application is possible to other circumstances. In general, whenever a number of human resources are scheduled to accomplish a defined task, the concepts and technologies described herein can be adapted to provide similar benefits as for a contact center. By way of example, and not limitation, this could include other professionals such as nurses, teachers, and sales staff. The concepts and technologies could also apply to non-skilled workers.

In some instances, the agent resource deficiency can be overcome by rearranging the work schedules of the involved agents. This includes, for example, shifting the break times of the agents to result in more agents working when the increase demand is required. In other instances, this is not sufficient to meet the anticipated demand and agents may be asked to work during their scheduled "off-hours." The process of having an agent work during a non-scheduled time is referred to as "recalling" the agent and a "recalled" agent is one who has agreed to work or who is working during a previously scheduled off-hour that was designated as "reserve time." Once the reserve time is actually committed to being worked, it is referred to as "recall time."

An agent may often agree to being recalled if the circumstances are convenient or it otherwise is desirable for the agent. For example, if an agent works in a physical contact center location and must commute from home to work, an agent may be more willing to be recalled if the recall time is contiguous with their work schedule (i.e., just before or just after their scheduled shift). However, if the agent works remotely, e.g., from home, then the agent may be willing to work an hour or two on their day off. Another consideration is that the contact center operator may allocate additional pay as an incentive for an agent to be recalled, and the rate may depend on when the recall occurs and how long it is. For example, a recall just before or after the agent's shift may have a 1× multiplier for pay adjustment, but if the recall time occurs on a Saturday, the recall time period may have a 2× multiplier.

The set of times outside the normally scheduled work hours for an agent or that may be available to the contact center operator may be referred to as "reserve hours" or "reserve time." Reserve time offers a buffer to the contact center operator and indicates when additional time, if required, can be obtained. As used herein, "reserve" when used as an adjective (e.g., "a reserve agent") generally refers to that which is associated outside the scope of a regularly scheduled work time of an agent. For example, a "reserve agent" is an agent who may be recalled, e.g., an agent who may be recalled to work outside their regularly scheduled work times. A reserve agent could be an agent who may be potentially recalled. A "reserve schedule" refers to the times where an agent has offered to work outside of their regularly scheduled work times. Given this definition, a "reserve schedule" is logically distinct from their conventional schedule (also referred herein as a "primary schedule"). The reserve schedule indicates "reserve times" which are the times indicated by an agent as potentially being available for recall. The reserve schedule does not necessarily reflect times when the agent has or will work, but indicates potentially when they may agree to work. In some embodiments, the reserve schedule reflects times that the agent may opt in to work, and is not necessarily required to work, if requested. In other embodiments, the reserve schedule may reflect times that the agent is required to work if requested.

Conventionally, an agent is associated with a work schedule, which defines the agent's shifts. The shift includes times when the agent is expected to be working, e.g., handling calls as well as breaks. The breaks can be considered as the times when the agent is not handling calls. This can include various types of breaks, including a rest break, lunch break, and training break. For example, an agent scheduled for an eight hour shift may have a mid-morning 15 minute rest break, a mid-day 40 minute lunch break, and another mid-afternoon 15 minute rest break. On certain days, a period of time may be allocated to training as needed. The rest break and lunch break may be times that are differentiated from a training break. Namely, in some embodiments, the agent is "on-the-clock," so to speak, during a training break. Hence, this time period may be also referred to as a "training session" to distinguish it from the other breaks.

While the agent's work schedule defines the times when the agent is working (e.g., handling calls or involved in a training session), it implicitly defines when the agent is unavailable, e.g., the agent's "off-hours." "Off-hours" means the times between an agent's shifts. For example, an agent may work a day-shift, e.g., from 9:00 a.m.-5:00 p.m. While the shift may involve various breaks, the agent is considered to be "off-hours" after 5:00 p.m. to 9:00 a.m. the next day. The agent could also be described as "off-duty."

In one embodiment, a reserve agent is an agent who may be available to work (e.g., handle ingoing or outgoing contacts) either during a scheduled break during their shift, or who may be recalled during certain times in their off-hours. These are two separate approaches for obtaining additional agent resources, which may involve slightly different procedures. For convenience, one is referred to as "break-shifting" and the other is referred to as "recalling an agent."

The first involves the agent working through a scheduled break, such as the rest break or lunch break. The agent could also work through a training session, which can be viewed as effectively cancelling the training session for the agent. In other words, if the agent is not in training then they would otherwise be handling calls, and cancelling the training session results in the agent involved in handling calls.

The agent could also work through a break, but for a variety of reasons, it may be necessary for the contact center administrator to shift the time of the break, as opposed to cancelling the break. In some embodiments, regulations or contractual obligations may require a rest break for agents at certain periods and/or a lunch break at certain time windows. Thus, this approach is referred to as "shifting a break" or "break-shifting", since the agent may be taking the break at another time.

The second approach involves recalling the agent, so that the agent works during their off-hours. This could involve, for example, an agent starting an hour earlier from their scheduled shift, working an hour later after their shift, or working on an off day.

To summarize, a reserve agent includes an agent who may work during their off-hours, on an off-day, during a break, or during an otherwise scheduled training session. A recalled agent is an agent who has agreed to work or who is working during their off-hours. In each case, the agent was not scheduled to be available for handling calls or other forms of communication, but is now available. It is evident that each reserve agent is an agent, e.g., they have a schedule for working. However, not each agent is necessarily a recallable agent. That is, an agent may be unavailable to work off-hours, and hence is never a reserve agent.

Generally, an agent can be a reserve agent, in that an agent's scheduled training session can be cancelled, and they could be assigned to handle calls instead. It becomes evident that the case of an agent working through a training session is a special case, which may have slightly different procedures associated with this situation. Typically, the contact center schedules an agent for handling calls, and may occasionally require training sessions to be scheduled. The contact center operator usually determines when and if agent training is required, and has the prerogative of unilaterally canceling training for the agent. With the training cancelled, the agent reverts to handling calls as normal. Thus, the agent can be viewed as a special form of recalled agent during this time.

The reserve schedule refers to the times that the agent is normally not handling calls, but where the agent has consented to possibly handle calls, i.e., consented to be recalled. The reserve schedule largely involves the agent's off-duty time, but it is possible that on-duty time may be involved. Namely, that the agent may agree to work during a break. This distinction should be kept in mind in considering the following concepts and technologies.

The reserve schedule defines the off-duty times where the agent may consent to work if requested (or may have to work if notified). To better distinguish between the reserve schedule and the conventional schedule, the conventional schedule is henceforth referred to as the "primary schedule." The combination of the reserve schedule and the primary schedule is referred to as the "master schedule."

Figure 2:
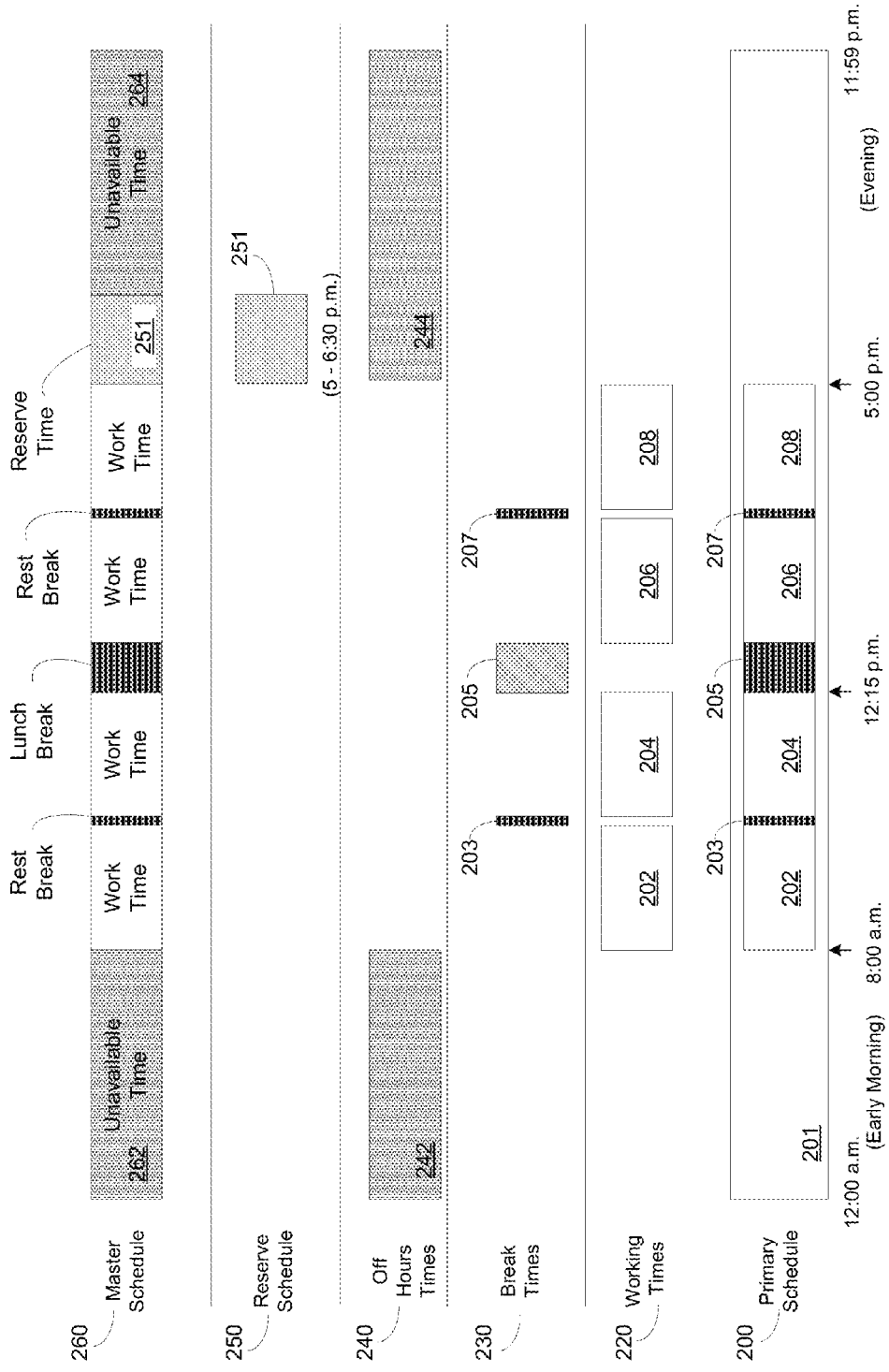
FIG. 2 discloses concepts of various types of schedules and time periods associated with an agent.

The concepts of these various types of schedules and time periods associated therein are illustrated in FIG. 2. The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Returning back to FIG. 2, the schedules and associated time periods are shown as "stacked" schedules where the horizontal axis represents time comprising various sets of time. The schedules shown depicts a single day, but this could also be expanded to depict a weekly period or other time periods. Other formats could be used to represent the time periods. The depiction is logical and intended to convey the various concepts and does not limit how the data is actually stored in an embodiment or represented to a user.

A primary schedule 200 is logically depicted for a hypothetical agent. This represents a single 24 hour day via a horizontal rectangle beginning at 12:00 a.m. on the left side, and continuing to 11:59 p.m. on the right side. The figures are not necessarily drawn to scale.

In the primary schedule, the agent starts their shift at 8:00 a.m., by beginning their first time period of work time 202. Work time in this figure refers to the time when the agent is handling calls. Around mid-morning, a rest break 203 occurs, followed by a second work time 204. Then at 12:15 p.m. a lunch break 205 occurs, followed by a similar schedule comprising afternoon work times 206, 208 with a second rest break 207 in between. The agent's shift ends at 5:00 p.m.

The primary schedule can be deconstructed into a working time schedule 220 which includes only the working times 202, 204, 206, and 208. During these times, the contact center can presume that the agent is available for handling communications. The break time schedule 230 includes a similar deconstructed view of only the breaks 203, 205, and 207. Various contractual and regulatory constraints may govern when these breaks may occur and how long they are. For example, it may be possible to shift forward a rest break by 15 minutes, but typically it cannot be moved from, e.g., the morning to the afternoon. Further, it may be possible to shift the lunch break a certain amount of time, but it may not be allowed, e.g., to move this to the end of the last working time 208.

The off-hours time schedule 240 shows the time periods of off-hour times 242, 244, which are the times in the primary schedule that the agent is not working or engaged in breaks. In this example, the time off periods include 12:00 a.m. to 8:00 a.m. and from 5:00 p.m. to 11:59 p.m. for the day.

The next schedule shown is the reserve schedule 250. This shows the reserve time period 251 which is the time during the off-hours that the agent has agreed to be potentially available, if requested, to work. In this embodiment, there is one time period 251 indicated between 5:00 p.m.-6:30 p.m., which is after the shift of the agent. Presumably, if the contact center has a number of agents (with different shift times), then collectively there are a number of reserve time periods covering various times when the contact center could request an agent to become a recalled agent. For example, agents assigned to an evening shift (e.g., 4:00 p.m. to 12:00 a.m.) may agree to a reserve time before their shift, such as between 1:00 p.m.-4:00 p.m. This would allow the contact center to augment their staffing early afternoon if required by requesting agents to work in this time period.

Returning briefly to the break time schedule 230, it is possible that some additional reserve capacity can be obtained to meet a defined need by shifting one of the breaks 203, 205, or 207 for a plurality of agents. However, there are typically limitations in how much these breaks can be shifted, and further, some of the breaks are relatively short (e.g., 15 minutes). Further, shifting a break may add agent resources during one time period, but may result in a deficiency of agent resources in another time period during the same shift. Thus, obtaining additional agent resource capacity may be possible by break-shifting, but it may be insufficient to meet the need, and instead may merely shift the agent resource deficiency to another time period. If circumstances permit, the resources may be taken at a time when there is an excess of resources present. However, shifting breaks may result in a subsequent deficiency that requires recalling agents at that later time.

The master schedule reflects how the various time segments are associated for a single agent. The data for a master schedule for an agent may be stored in a data structure in a WFM. In some embodiments, existing primary schedule data structures generated and maintained by a WFM can be augmented to incorporate the concepts identified above, as opposed to maintaining another data structure. Regardless of how the various schedule data is stored, the reserve schedule can be conceptually viewed as separate from the primary schedule, as will be seen.

The master schedule 260 reclassifies the off-hours designation, as indicated in the off hours schedule, into two separate designations: unavailable time 262 and 264 and reserve time 251. If the agent designates a portion of their off-time as potentially being available for recall, then that time is designated as reserve time. The remaining time is classified as "unavailable." In essence, the unavailable time is not eligible for recalling that agent. This time can be described as off-hours time that really is off-limits from working. The unavailable times could reflect, for example, prior commitments of the agent such that they would refuse any recall request during this time. It could reflect, e.g., a time at which they must pick up a child from daycare, attend an event, etc.

In some embodiments an agent can be liberal in designating their off-hour times as reserve time. The agent may take the view that they would like to be offered the opportunity to be recalled, and can always deny the invitation to be recalled if it is inconvenient to the agent. However, from the contact center administrator's perspective, it is undesirable to have reserve times in an agent's reserve schedule that is unlikely to be used as recall time (e.g., the reserve time is not a reliable indicator of when the agent can be recalled). The administrator would prefer that any indicated reserve time can be relied upon as potential recall time. To this extent, mechanisms can be defined that eventually "weed out" such agents from being invited. For example, one mechanism could calculate a probability of an agent accepting an invitation, and if it drops below a threshold, that agent may be precluded from indicating any further reserve time, or any existing reserve time could be deleted. Additional tools can also serve to remove such agents' reserve schedules from the master schedules.

Process Flows

Figure 3:
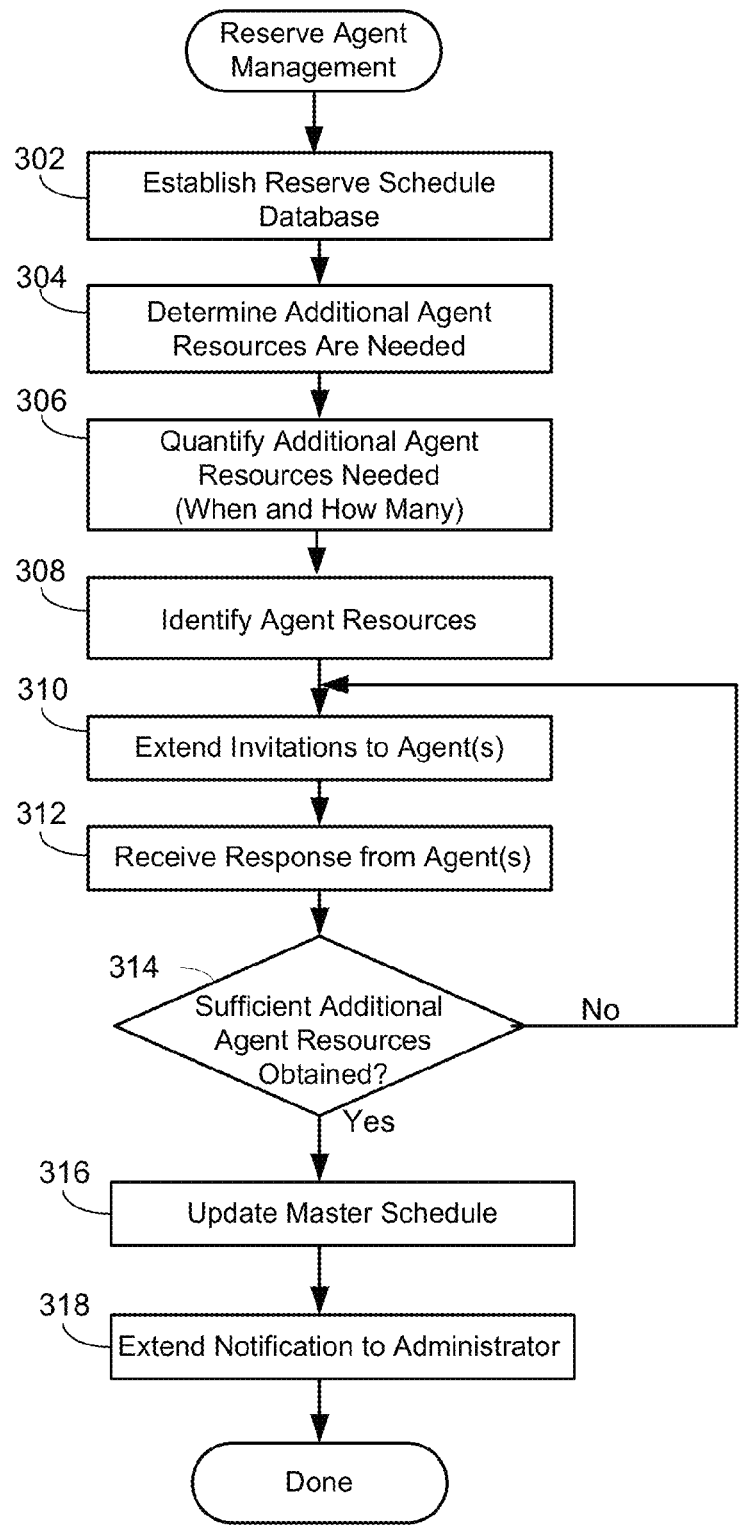
FIG. 3 discloses a high level overview of a process flow for managing reserve agents according to one embodiment.

One embodiment for managing reserve agents in the RAMS is shown in FIG. 3. The process provides a high level overview of some of the operations that may be present, which are discussed in further detail below. As will be evident, variations on and within this process flow are possible, and FIG. 3 illustrates only one embodiment.

The process begins with establishing a database of reserve schedules in operation 302. This database is established before there is even a need detected due to an agent deficiency. The opportunity to establish a reserve schedule would typically be offered to all the agents in the contact center. In one embodiment, this can be done using surveys, asking agents to interact with a web site for viewing and defining their reserve schedules, or via email to an administrator who enters the information. This operation essentially involves agents identifying any times during their off-hours when they would be willing to be recalled for work. Any number of mechanisms can be used, and one embodiment disclosed herein elaborates on the agent interacting with a portal.

Figure 4:
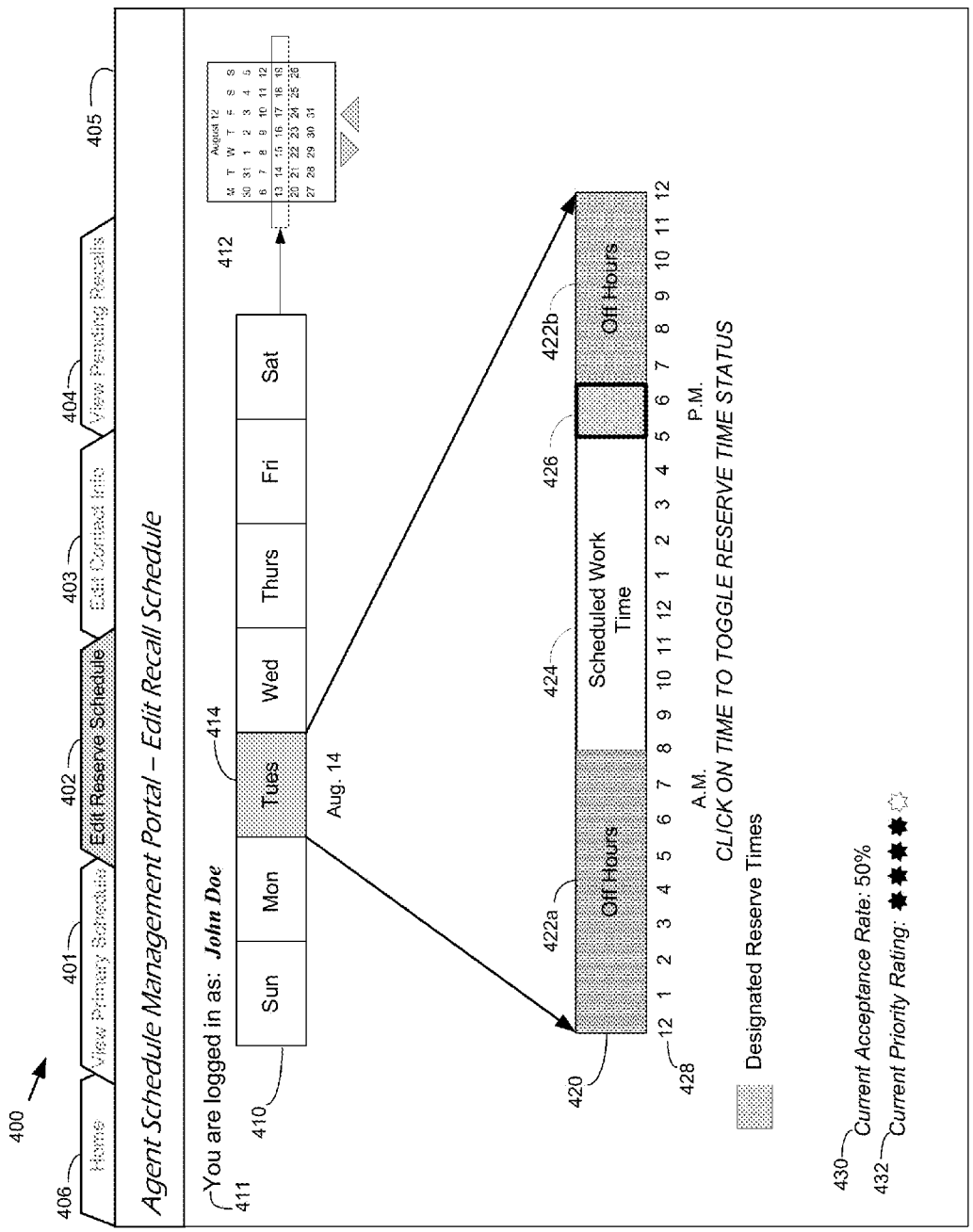
FIG. 4 illustrates one embodiment of a graphical user interface illustrating a graphic image indicating various types of time periods of an agent's schedule.

For example, in one embodiment the agents may use the portal to view their primary schedule and generate their reserve schedules. This may involve the agents selecting which time periods on which days they would be willing to be recalled. Just by way of example and not limitation, an agent may be willing to identify hours just prior to, or after, their conventional shifts as reserve times. Or, an agent may be willing to identify times on their days off. If the agent pool is large enough, it is likely that when additional agent resources are needed there will be sufficient reserve time to cover the need. Agents could initially create a reserve schedule and update it on an "as-needed" basis, or periodically, such as once every month. Various mechanisms, which will be discussed further, could be used, include mobile devices accessing a portal where agents can access their schedules, one embodiment of which is shown in FIG. 4.

In various embodiments, agents could be required to specify a minimum time duration for reserve time, e.g., on a 30 minute or 60 minute basis. It is often desirable for the minimum reserve time period to be a whole number multiple of the minimum time period used by the WFM. For example, the WFM may manage resources in 15 minute intervals, but it may be difficult to have an agent agree to be recalled for 15 minutes. Rather, an agent may expect to be recalled for a minimum of, e.g., an hour. Further, the contact center may generate forecasts on an hourly basis, and thus, resources are required for at least an hour.

The establishment of the reserve schedule may be established well in advance of the subsequent steps, i.e., when a determination is made that additional agent resources are required. This could be days, weeks, or even longer.

The next operation involves the determination that additional agent resources are needed in operation 304. The determination of "additional agent resources" is relative to the agent resources currently scheduled or working. In other words, if agent resources are scheduled, at some point after this schedule is generated a determination is made that additional agent resources are required. This could be in advance of the shift being worked, or during the shift as it is being worked.

For example, in one embodiment, a contact center may generate an agent workforce schedule every two weeks. This allows agents to know in advance which days and times they are working, and which they are not. It may be a relatively static schedule. That is, some agents may generally have the day shift, but may start at either 9:00 a.m. or 9:30 a.m. Some agents may generally have the evening shift and start at certain times. Either during a campaign, or before the campaign has started, but after the schedule is set, a determination is made that additional agents are required.

This determination may be made in a number of ways. For example, during a campaign or a given shift, existing service levels may be monitored (such as call waiting times) throughout the working hours and determined to be unacceptable. Or, certain goals may be monitored and determined to be unmet. Other mechanisms may be involved in the determination as will be discussed further. A threshold value may be defined above which a measured value causes the determination to be made. The determination may be made in advance of the campaign. For example, forecasting tools may indicate that an agent resource deficiency is expected.

The determination of whether additional agent resource deficiency is met may involve ascertaining that there is a sustained agent resource deficiency. Mechanisms may be defined to avoid "false reports" where a minor measurement aberration triggers recalling agents, when the aberration is not indicative of a sustained need.

In the next operation 306, a determination is made of the quantity and times of when the additional agent resources are required. In essence, this determines how many agents are required and at what times. This may be measured in various ways. In one embodiment, a specific duration may be assumed such as for a 30 minute or 1 hour time period. For example, the quantity and time could be defined as: an additional 5 agents are required for 1 hour starting at 2:00 p.m. (e.g., all five agents at one time between 2-3 p.m.) Or, the requirement may be stated as 5 agent-hours starting at 1:00 p.m. and continuing through 6:00 p.m. (one additional agent for 5 consecutive hours).

The combination of the determination that additional resources are required, and the determination of how many and when these resources are required (operations 304 and 306), are collectively referred to as "triggering." The triggering operation may monitor or otherwise involve other systems which detect, analyze, and quantify an agent resource deficiency After the number of agent resources required has been quantified, the next operation is to then identify or select the agent resources that potentially can fill the need in operation 308. This involves determining which agents have reserve schedules and when the reserve times are indicated, so that these reserve times may be analyzed to see if they can potentially be used to meet the defined deficiency. For example, assume 5 agents are needed for one hour starting at 2:00 p.m. It would not be beneficial to select an agent having a reserve hour starting at 5:00 p.m. (this would be too late). However, it would be beneficial to identify an agent who has a day off, and has indicated they could work in the afternoon (e.g., they have indicated the afternoon as reserve time). Similarly, an agent working a shift ending at 2:00 p.m. and that has indicated reserve time at 2:00 p.m. would also be a potential recall candidate.

In many embodiments, there may be a number of agents who potentially could be selected for meeting the resource deficiency. If there are more agents than required, then there may be rules defining how the agents are selected. As will be discussed further, a myriad of rules could be defined indicating how agents are selected and this may impact how the agents are informed.

Agent selection could be defined by a priority metric which indicates a weighting for defining which agents are selected first. The metric could be based on seniority, pay rate for the agent, skill level, willingness to work reserve time, etc. Such a metric would favor eligible agents first respectively based on: e.g., seniority, inversely proportional to their hourly rate, those having matching skill levels, those previously accepted requests for reserve time, etc.

Once these agents are identified, then a notification is extended to those agents in operation 310. This notification may be in several forms. A common form can be described as an invitation or request to the agent asking them if they would agree to be recalled. In many embodiments, if the reserve agent is giving up time during their off-hours, it is appropriate to confirm whether they can accommodate the request. On the other hand, if the reserve agent is going to have their lunch break shifted by 15 minutes, the reserve agent may be simply told that this is occurring. Similarly, if a training session is cancelled by the administrator, the agent may simply be told (as opposed to being asked) that the training is cancelled or postponed and that the agent is required to handle calls during that time.

In some embodiments, the contact center operator may have negotiated up front with the agent that certain reserve times are mandatory. For example, the first hour of reserve time after a shift is "mandatory" for recall. All other reserve times on their off-hours are discretionary for recall. For example, after the first hour after their shift, the second hour may be optional or discretionary. Thus, the agent may be informed of a mandatory recall or asked for a discretionary recall, and a number of variations are possible.

The recall invitation can be sent to a mobile device associated with the agent. The invitation can be sent as text or via email to the agent's indicated email address. The invitation can also be sent to the agent's desktop if the agent is currently logged in. Other forms are possible.

The discretionary recall invitations sent in operation 310 can be sent serially or in parallel to a group of eligible agents. In one embodiment, the invitations are sent in parallel (e.g., "blasted") and the responses are received in operation 312 as the agents respond. In one embodiment where the invitations are sent serially, a response or timeout governs when the next invitation is sent out to the next agent. Once the required agent resources are obtained, no further invitations are extended. This latter approach may take more time, and circumstances may not always allow serial invitations to be sent. Variations are possible, including sending a "mini-blast" of invitations to a subset of the group of agents, waiting for their response (or a timeout) and then sending another mini-blast to a second group, and so forth.

As the responses are received, they are analyzed to determine whether sufficient agent resources have been recalled in operation 314 such that no further recall invitations are to be sent out. If an insufficient level of agent resources has accepted the invitation, then the process loops back to operation 310. An insufficient level of agent resources could be determined based on the expected reserve hours to be obtained based on each agent's likelihood of accepting the invitation for a given time. For example, if 10 agent hours are required and a set of 20 agents have been identified that could each contribute a single reserve hour and each agent has a 50% historical acceptance rate, then the expected reserve hours would be: 20 agents at one reserve hour*0.5 probability of accepting=10 expected reserve hours. Once agents have accepted, the recalled agents have their master schedules updated in operation 316 to reflect that for the appropriate reserve times that they have been recalled.

In operation 318 an indication is provided to the administrator, which may reflect a summary of the results. The indication may inform the administrator whether the deficiency was meet, which agents accepted the recall invitation, any unmet resource deficiency remaining, etc. At this point, the process is done.

Subsequently, when the respective recall times arrive for each recalled agent, the WFM knows that the recalled agent is expected to be available, and allows the recalled agent to log into the contact center (or remain logged in, if merely extending their shift hours), and to handle calls.

Architecture for Managing the Reserve Schedule

Various architectures can be defined for managing the reserve schedule. The reserve schedule is generated based on agent review and input typically after the primary schedule is developed. In one embodiment, the agent reviews the primary schedule and then generates and/or edits their reserve schedule. Thus, in some embodiments, it may be necessary to first have a primary schedule developed, which typically is done by the WFM. The architecture allows the agent to review the primary schedule created by the WFM and provide input to generate the reserve schedule, which may also be maintained by the WFM.

The WFM creates the primary schedule under the direction of the contact center administrator who is given authorization to view and edit any of the primary schedules. However, in one embodiment, the roles of the agent and the administrator are different with respect to each other in regards to the reserve schedule. Specifically, in regard to the primary schedule, the administrator has authorization to control the work times, and the agent may be limited to only review the primary schedule. Typically, the agent is not allowed to directly edit or alter their work times after it has been generated.

However, in regard to the agent's reserve schedule, the agent typically is allowed to edit the times indicated as reserve times. In some embodiments (though not all), the administrator may be able to only review the agent's reserve times, and is unable to change them. Thus, with respect to controlling the schedule, the administrator controls the primary schedule and the agent controls the reserve schedule. Typically the agent can only review the primary schedule and the administrator can only review the reserve schedule.

Note that is some embodiments, the administrator may be able to control the reserve times of an agent. In some embodiments the administrator may add reserve hours for an agent, but is expected to only do so with the authorization of the agent. For example, an agent during their off-hours without Internet access may verbally indicate to the administrator that they would like to change the status of their reserve time, and request the administrator to make the change on their behalf. In other embodiments, the administrator may remove reserve hours for an agent. For example, an underperforming agent or one that is at the maximum allowed hours may have their hours removed by the administrator or the system.

The primary schedule is used by the WFM and contact center for indicating when an agent should be working, and various controls are necessary before an agent's working schedule can be changed. However, because the reserve schedule functions slightly differently, it is possible to allow greater flexibility in the controls with respect to altering indicated reserve times. Generally, once the agent is authenticated, the system can allow that agent to alter their reserve schedule at any time.

Figure 5:
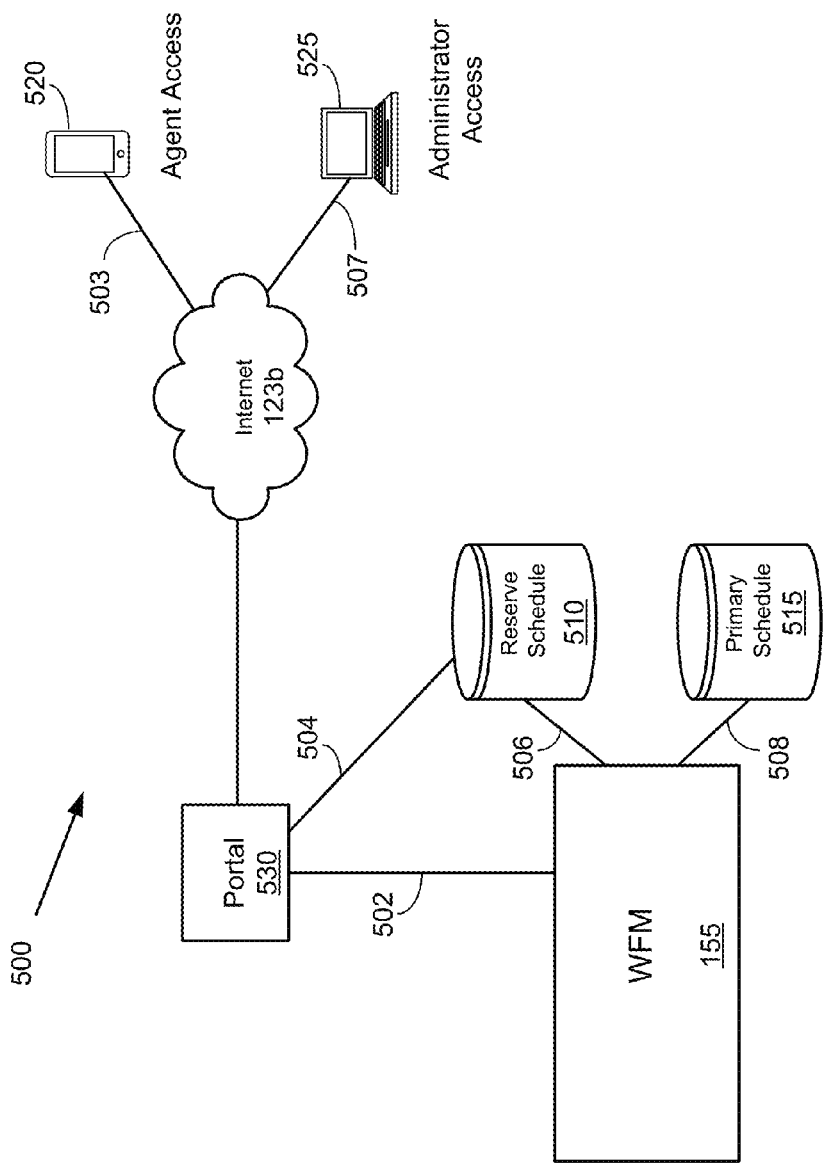
FIG. 5 illustrates one embodiments of an architecture for facilitating an administrator and/or an agent to access with a portal for managing various types of schedules.

One such architecture for managing the agent reserve schedule is shown in FIG. 5. In the system 500, two different users are illustrated. The first user is the agent. The agent may access the portal 530 via a fixed location processing device, such as their workstation. In many embodiments, the agent may be off-duty and may use a mobile device such as a smart phone 520 or tablet. The agent may use such devices to review and edit their reserve schedule. The various wireless infrastructure components for effecting the connection 503 to the Internet 123*b* are not shown.

The other type of user may be the contact center administrator. The administrator may also use a mobile device, but may also use a fixed-location computer 525, typically located in the contact center. The infrastructure for effecting the connection 507 is not shown, but may include a LAN in the contact center.

Both types of users access the portal 530, which may be a web server or host computer with functionality integrated into the WFM 155. For illustrating the concepts herein, the portal 530 is shown as a separate logical entity. The portal 530 may access the WFM 155 via connection 502, which may be a LAN. The WFM 155, in turn, accesses and controls the reserve schedule database 510 via connection 506 and the primary schedule database 515 via connection 508. In many embodiments, these databases are integrated into a single physical database, and may be further integrated into the WFM 155 system. However, for purpose of illustration, these are shown as distinct entities.

In one embodiment, access to the primary schedule by a user occurs via the portal 530 and the WFM 155. Either the portal or the WFM, depending on the embodiment, allows read-only access of the primary schedule to the agent (and only for that agent's schedule) whereas the administrator may be granted additional privileges. Either the portal or the WFM may grant the agent additional privileges with respect to accessing the agent's reserve schedule, whereas the administrator may be limited in modifying the agent's reserve schedule.

In some embodiments, the portal may even allow an agent to access the reserve schedule database 510 directly via connection 504, bypassing the WFM. One skilled in the art will recognize that different architectures could be defined to accomplish the functionality indicated. This embodiment uses a portal to authenticate the user, determine whether they are an agent or administrator, and grant the appropriate read-only, or read-write privileges depending on which database the user is accessing. Other embodiments may integrate these functions and the portal into the WFM, and integrate the reserve schedule and primary schedule into a single system.

The above architecture allows the generation of the reserve schedule to be controlled by the agent, allows the agent to review their currently defined reserve schedule, and allows the agent to update the reserve schedule to reflect changes in their availability for recall. The portal may provide other functions associated with the reserve schedule database. It may provide the GUI 400 of FIG. 4, comprising a screen display 405 with various function tabs 406, 401-404, with a line identifying the agent 411, a week's view 410 of a calendar 412 including a day's view 420 with hourly indicia 428. The day's view may include a portion for off hours 422a, 422b, scheduled work time 424, and reserve time 426 of a particular day 414. Further, this may be presented along with the values of the agent's acceptance rate 430 and/or priority rating 432. In addition, if the agent requests to view their primary schedule, edit their contact information, or view pending recall requests by the contact center, this information can also be provided to the agent via the portal.

Triggering Process Flow

Recall from the previous discussion that once the reserve schedule database has been established, it can then be used to address an agent resource deficiency during operation of the contact center, or prior thereto. As noted previously, this requires that the contact center has the triggering mechanism to ascertain 1) if additional agent resources are required, and if so, 2) how many and when are these resources required. There are a number of triggering mechanisms that can be defined in various embodiments for determining these aspects. A process flow for one embodiment illustrates the basic triggering framework, and alternatives that modify this framework will be further identified.

Figure 6:
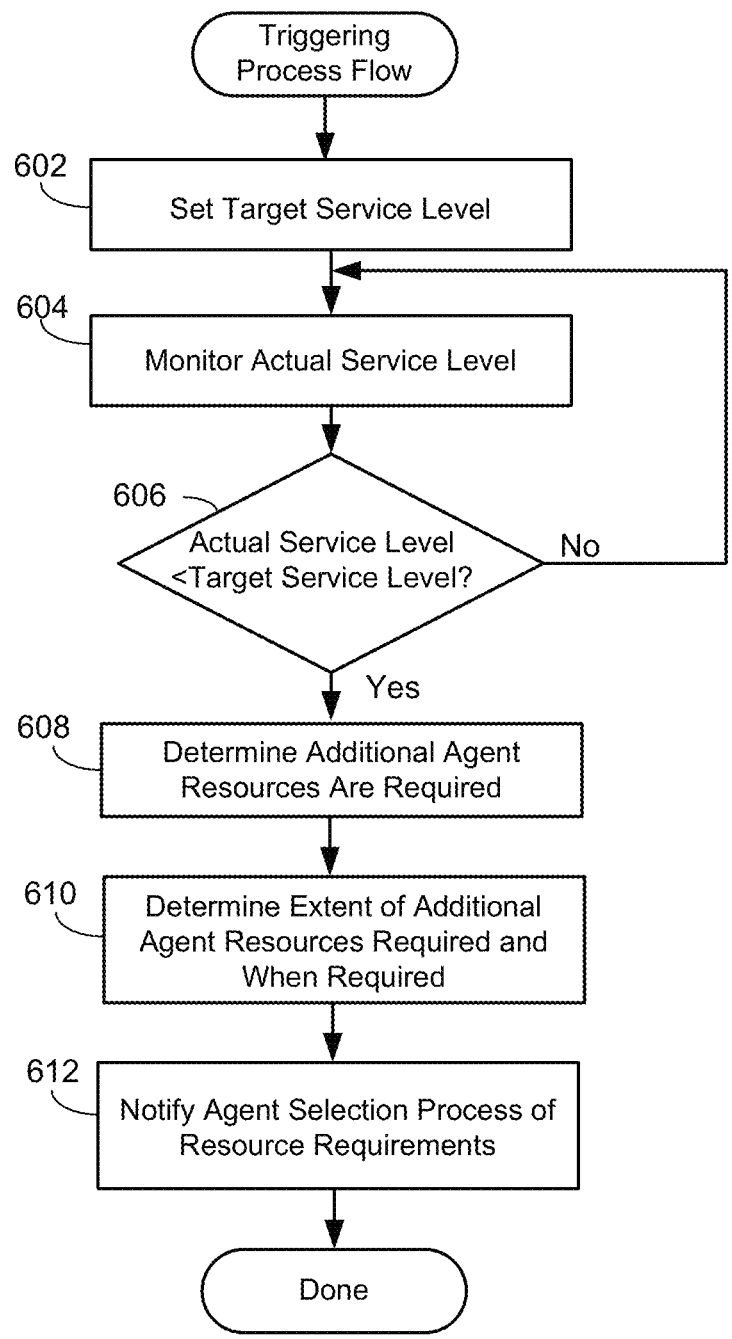
FIG. 6 illustrates one embodiment of a triggering process flow.

Turning to FIG. 6, the triggering process flow begins in operation 602 with setting a target service level for incoming calls. For purposes of illustration and not limitation, it is assumed that incoming calls are assigned a service level so that 80% of the inbound calls are targeted to be answered within 20 seconds. Other service level parameters could be applied as key performance metrics to determine an agent resource deficiency. This service level metric is monitored during the operation of the contact center in operation 604.

If it is determined that the actual service level meets or exceeds the target service level in operation 606 (indicating there is no service level deficiency), then the process loops back to operation 604 and continues to monitor the actual service level. If the actual service level is less than the target service level, then the process proceeds to operation 608.

At this point, a determination is made that the condition is not temporary or an aberrational event, and warrants allocation of additional agent resources. If not, then the process could loop back to operation 604 (not shown). In operation 610, the extent of the additional agent resources required is determined, along with when the agent resources are required. The output may indicate the number of agent resources for one or more time periods. Further information may indicate what skill levels are required. The time period used may be based on the smallest time period that the WFM can schedule resources. Thus, if the smallest scheduling period is 15 minutes, then the time period indicated for additional agent resources may be e.g., 15, 30, or 60 minutes. An exemplary output could be a file delineating additional agents required for each hour during the identified period. For example, the file could indicate 3 agents are required at 3:00-4:00 p.m., 4 agents are required at 4:00-5:00 p.m., and 6 additional agents are required at 5:00-6:00 p.m. A certain skill level or other agent qualifier could also be included.

The next operation occurs with providing the file indicating the required agent resources to the agent selection process in operation 612. The agent selection process, discussed next, receives the output above to select which agents are to be invited to be recalled to meet the determined need. The process then completes.

There are a number of other different approaches for detecting a deficiency that can be used instead. One approach is disclosed in U.S. Pat. No. 6,724,884, entitled Call Management System Using Fast Response Dynamic Threshold Adjustment. This allows a threshold to be defined before determining that additional agent resources are required. It can be appreciated that a single occurrence of a service level deficiency may not be sufficient to trigger the recall of agents. It may be necessary to ensure that the deficiency is sustained and significant to warrant recalling agents.

Another approach for determining there is an agent and/or service level deficiency can be based on the approach defined in pending U.S. patent application Ser. No. 13/688,716, entitled Revising Outbound Forecasts and Corresponding Schedules Based on Performance Data, filed on Nov. 29, 2012, the contents of which are incorporate by reference for all that it teaches. That application details using performance data associated with the execution of a current campaign for the purpose of revising a prior forecast and agent schedule for the campaign to ascertain whether additional agent resources are required.

Another approach for determining an agent deficiency can be based on conventional forecasting algorithms which indicate an agent resource level, but where the agents have already been scheduled. In such instances, it may not be possible to generate a new schedule and therefore this information is used to recall agents to meet the deficiency. For example, twenty agents are assigned to a campaign for the next two weeks. A conventional forecast determines that 23 agents will be required throughout the campaign. Rather than generating a new schedule, the resource deficiency is address by accessing the reserve schedule to identify the agents to be recalled.

Another approach for determining an agent deficiency is to monitor other forms of performance indicators or service metrics. For example, an agent utilization metric is commonly used in contact centers that measures the utilization of agents. It has been commented that agents operating at a certain range of utilization so that they are busy, but not so busy to be susceptible to "burn out." For example, it is reported that agents working at 90% utilization are susceptible to being over-worked. Thus, some contact center operators will define a threshold at which additional agents will be scheduled. Other metrics, such as the number of calls handled can be used. If a target level of calls handled per hour is not being met, then a deficiency could be indicative of a need to add agents. The deficiency could be due to agents not reporting or logging into work as expected.

Another source of determining there is an agent deficiency is the WFM. The WFM may know that a certain number of agents are required at certain times, and capabilities in the WFM may allow an agent to report in sick at the beginning of a shift (or other indications of a "no-show"). In this case, the WFM knows that there is an agent deficiency and it can further identify the times when the agent will be unavailable.

Finally, another approach for determining agent deficiency could be a manual approach. The contact center administrator could determine by any number of manual means that an agent deficiency is present. The administrator may note that agents may be late in reporting to work, have called in sick, or otherwise must leave or are unable to work during their scheduled shift. The administrator could determine that an agent deficiency exists by monitoring and analyzing service metrics and may also determine how many agents are required and when they are required. Adverse weather, disaster conditions, or other circumstances could result in a large number of agents unable to attend or cause an increase in call volumes. In such circumstances, the administrator may manually determine the deficiency. An appropriate GUI could be defined allowing the administrator to manually input these values in lieu of an automated triggering process.

Agent Selection Process

The agent selection process is involved with identifying agents to fulfill the agent resource deficiency. In other words, this process identifies the agents to be recalled. This process can widely vary in embodiments as a large number of different rules can be defined for how agents are selected.

Figure 7:
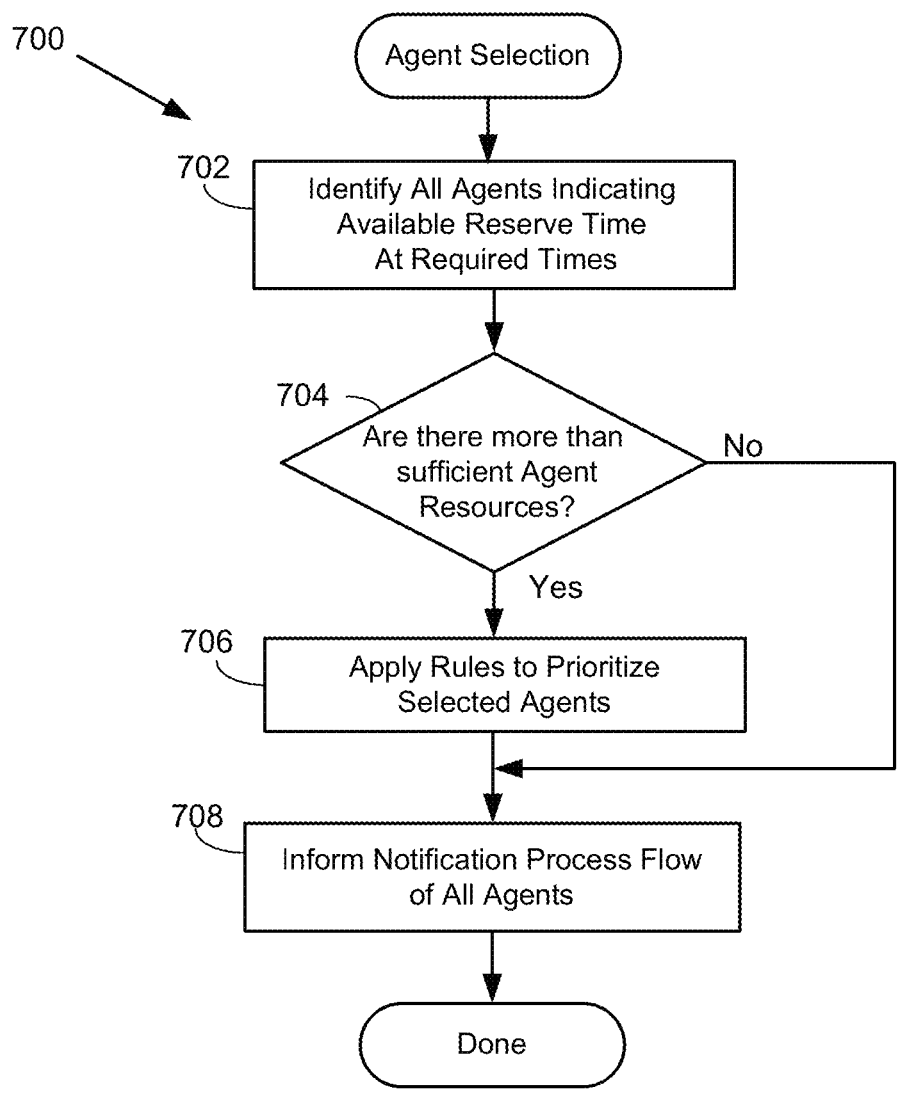
FIG. 7 illustrates one embodiment of an agent selection process flow.

A high level description of one embodiment of the process flow is shown in FIG. 7. This process flow does not depict all the various types of rules that can be applied, but illustrates how different rules can fit within the overall process. The process 700 begins after having previously received input that indicates how many agent-hours are required at what times.

The first operation 702 is to search the reserve schedule to identify all the agents that have any reserve time that is coincident with the required intervals. An elementary example illustrates this aspect. Assume that the triggering process has identified that two additional agents are required between 5:00 p.m. and 6:00 p.m. on the current day (e.g., two agent-hours). Further assume that the database shows that of 20 agents, 15 have indicated some form of reserve time in their respective reserve schedule. Of the 5 agents that have not indicated any available reserve time, these can be disregarded since they have indicated that they have no available reserve time. Focusing on the 15 that have indicated available reserve time, suppose there are 5 agents that do not have any available reserve time in the 5:00-6:00 p.m. time frame. These agents can also be disregarded. That means there are 10 individuals that have reserve time that could contribute to the deficiency at this time.

In operation 704, a test is made to determine whether there are more candidate reserve agents than required to meet the need. If there are fewer individuals identified in the reserve schedule than can meet the need, then this means that even if all the individuals were recalled, it still would not be sufficient to meet the required demand. If this is the case, then all of the individuals should be contacted. This is reflected by the process flow continuing to operation 708 where the notification process flow is informed of the list of identified agents.

If, however, in operation 704 there are more agents than needed to meet the demand, then in operation 706 various rules may be applied to prioritize which of the identified agents should be selected. Returning to the example above, it was determined that there were 10 agents that indicate reserve times at the needed time period. (Recall that two agents were needed.) Thus, there is a surplus of potentially available reserve agents. This may require application of a rule to identify which agents are to be selected since only 2 of the 10 are needed.

The rules that can be applied in operation 706 to select or prioritize the agents can vary. The rules can utilize information associated with the agent (e.g., in an agent profile) to prioritize one agent over another. The following is a non-exhaustive list of examples of information that can be used to determine which agents will be invited to be recalled, or the order in which recall invitations are sent:

Seniority. Agents can be ranked via seniority as to whether they will be notified for recall. The seniority can be based on years of service, or by job title. Those with greater seniority have priority over those with less seniority.

Pay Level. Agents can be ranked by their pay rate. In one embodiment, the lower pay rate agents have a higher priority, so that identification of agents results in a least-cost result.

Contract. Agents may be associated with a union or employment contract, so that agents associated with one contract may be prioritized relative to agents associated with other contracts.

Skill Agents may be prioritized by skill level. Agents with a compatible skill may be given priority over agents that do not have a compatible skill. The skill level can be measured by various metrics, including but not limited to: language spoken, product knowledge, areas of competency, completion of courses, etc.

Teams. Agents on a common or specified team may have priority over agents on another team.

Recall Priority Level. A priority level can be assigned to each agent by the contact center administrator indicating a relative priority for consideration for recall. Agents with a higher recall priority level are prioritized ahead of those with a lower recall priority level.

Recall Acceptance Rate. A recall acceptance rate can be calculated for each agent based on how often they accept a recall invitation. Those that accept recall invitations more often than others would have priority. For example, an individual accepting 1 of the last 10 recall invitations would have a rate of 10%, whereas another individual accepting 5 of the last 10 invitations would have a rate of 50%, and therefore would have priority.

Contiguous Shift. Agents which can fulfill the agent deficiency by staying late or coming in early on an existing scheduled shift may have priority with respect to those agents that do not have an existing shift. In other words, if an agent can meet the deficiency by extending their existing shift as opposed to an agent who has to work on a day off, the former has priority over the latter. It may be unlikely to have an agent on their day off to come in for an hour or two, whereas an agent already working may readily agree to extend their shift by an hour or two. This rule may have different utility based on whether the contact center allows remote agents. Specifically, if agents can work-at-home, then being recalled for an hour or two is largely indistinguishable from their normal work pattern. However, an agent who has to commute to a contact center for an hour or two to work on their day off may not find the recall invitation worthwhile.

Break Shifting/Training Cancellation versus Agent Recall. A contact center may have a priority allocated for meeting an agent resource deficiency by first attempting to perform break shifting and/or training cancellation, as opposed to recalling agents during off-hours. For example, the contact center may prefer to cancel or postpone agents scheduled over recalling agents during their off-hours.

In many embodiments, logical combinations of the above can be used to determine the rule for prioritizing agents. For example, a contact center may prefer to cancel existing training first, and if demand exists, then select agents that have the appropriate skill level with the required priority. In another embodiment, the above requirements could apply but the rule further comprises selecting agents based on their seniority first, and then by lower pay rate first. Various logical constructs involving these and other rules can be fashioned to specify criteria to order a plurality of agents, or further qualify agents to meet the deficiency.

In addition, the rules can define exclusions or negative preferences. Exclusions would eliminate agents, whereas negative preferences allocate a very low priority. For example, a rule could be defined to avoid including agents who already are scheduled to work a certain number of hours per week. For example, employees classified as part-time may be limited to 30 hours/week, or others working 40 hours/week may be excluded so as to avoid paying overtime hours to these agents. In such instances, agents having a primary schedule of less than 40 hours/week would have priority over those already scheduled to work 40 hours that week. In other embodiments, the metric could be hours worked/day. Or, an exclusion could be defined to avoid selecting any agents associated with a specific employment contract. For example, a union contract may have a negotiated rule that no agents associated with a certain contract can be recalled. In that case, the selected agents would have to exclude all agents associated with that contract.

The rules mentioned above are for illustration purposes only, and are not intended to limit the type of rules that can be specified. Those skilled in the art will be able to develop a number of variations for agent selection rules and logical constructs to be applied in light of this disclosure.

In one embodiment, the output of the agent selection process is an ordered list of potentially available agents. The order of the agents could reflect each agent's relative priority to others. In other embodiments, the rules may be used to define which agents are in the set, without any indication of priority. For example, application of a seniority rule can be use to prioritize all eligible agents, where the order reflects the agent's seniority. This could be coupled with a foreign language skills set (e.g., ability to speak Spanish) which further defines who is eligible, but which does not by itself rank or prioritize the agents. In another embodiment, the application of a seniority rule could be defined to include all eligible agents (e.g., all agents with 3+ years of experience). In this case, any agent meeting the rule has the same priority as other agents in that group. The list of agents is then provided to the agent notification process whereby the agents can be notified for recall.

Agent Notification

The agent notification process informs the agents of the recall. There are two main types of notification, and certain embodiments may employ one or the other, or a combination of the two. These types are parallel notification and serial notification. These can be effectively accomplished in different ways. In one embodiment, the difference involves whether the agents' acceptance of a recall invitation is processed in a certain order or in a first-come basis.

Parallel notification is essentially a broadcast-like form of notification where agents are effectively simultaneously informed of the agent recall. For example sending out a "blast" of emails would be parallel notification. (The split second sequencing of emails would not be considered a serial form of notification.) Similarly, making the information available for all agents to view on a web site would be considered as parallel notification. Once an agent is notified, the agent may have the opportunity to respond (e.g., to accept the recall invitation). Once the agent responds, their response is processed in real time (first come) or in a defined order (based on a priority).

Serial notification is notifying agents in a time-sequenced manner, for the purposes of receiving their responses in a time-sequenced manner. Thus, for example, Agent A is notified first and a response is received, and then Agent B is notified and a response is received, etc. This allows agents to be notified, and their responses processed, in a serial form. There is little practical application for notifying agents serially, but then processing all of their results in parallel. Hence, serial notification lends itself to serial processing of the results.

The form of notification is related to determining which agents will be offered and allowed to accept an agent recall when there exists the potential for more agents than needed to fill the need. In other words, if 10 agents are recall eligible, such that only 1 agent will fulfill the need, it may be appropriate to prioritize agents for purposes of notification. A practical consideration for providing serial notifications is that an agent may not readily respond to an invitation quickly, and so a time limit may be assigned before the next agent is informed and allowed to respond. In the above example, if each agent is given 1 hour to respond, then it is possible that the $10^{th}$ agent will receive the invitation 10 hours after the first invitation. If the need for additional agent resources is fairly immediate (e.g., within the next several hours), then the serial notification form may not be practical. If the need is determined several days in advance, then the serial notification form may be practical.

How the agents are notified and their acceptances received may dovetail with the structure of the agent selection list as described above. Namely, a prioritized agent selection list may be used with serial notifications and serial processing of their responses. A prioritized agent selection list could also be used for parallel notification and prioritized processing of responses. For example, in one embodiment, agents are notified in a serial manner. First, Agent A is notified, then Agent B, then Agent C, etc. The order reflects their priority. On the other hand, notifying agents in parallel and processing responses as they are received negates any form of priority, since lower priority agents could respond before higher priority agents. However, in another variation of parallel notification, the responses received are only considered after a response window has closed, and then the responses may be analyzed in terms of a priority.

Various combinations of serial and parallel notification are possible. For example, a first group of five agents could be notified in parallel and their responses processed with a time limit of 1 hour. Then, a second group of five agents could be notified in the next hour, etc.

In another embodiment, non-prioritized agent lists are determined, and notification and responses examination occurs in parallel. After a time period in which responses are allowed and processed, the agent responses are prioritized using an acceptance rate value or priority value. Agents with the highest acceptance rate are processed first, and so forth. This approach simplifies the notification process (e.g., it is parallel notification with a limited window to respond) but yet allows a priority to be assigned to the responding agents. In this embodiment, an agent does not know whether their acceptance of the invitation is counter-accepted by the RAMS until a confirmation to the agent is provided. For example, 10 agents may respond to the invitation, and the first five are processed and meet the need. The remaining five are notified that their acceptance to the recall is, in fact, rejected or waitlisted by the system. In this embodiment, the notification of invitation is more accurately referred to as an offer to the agent to indicate their willingness to be recalled, as opposed to a request to accept the invitation.

The form of the agent notification of the invitation can occur via individual communication means, including email, text messages (e.g., short message service), or automated telephone calls. In one embodiment, the communication can be via an IVR as described in co-pending U.S. patent application Ser. No. 13/665,298, entitled "Fulfilling Staffing Requirements Via An Interactive Voice Response System," and filed on Oct. 31, 2012, the contents of which are incorporated by reference. The email could include a link to a website in the portal containing additional details. The portal 530 may maintain the agent profile that includes the email address information for each agent, which the agent can update as necessary.

The above means are well suited for either serial or parallel notification. For parallel notification, the emails, text, or phone calls would have to largely occur simultaneously to be considered as parallel notification. In other embodiments, an email providing a link to a website can be used, where the website provides information to any agent accessing the site.

Figure 8:
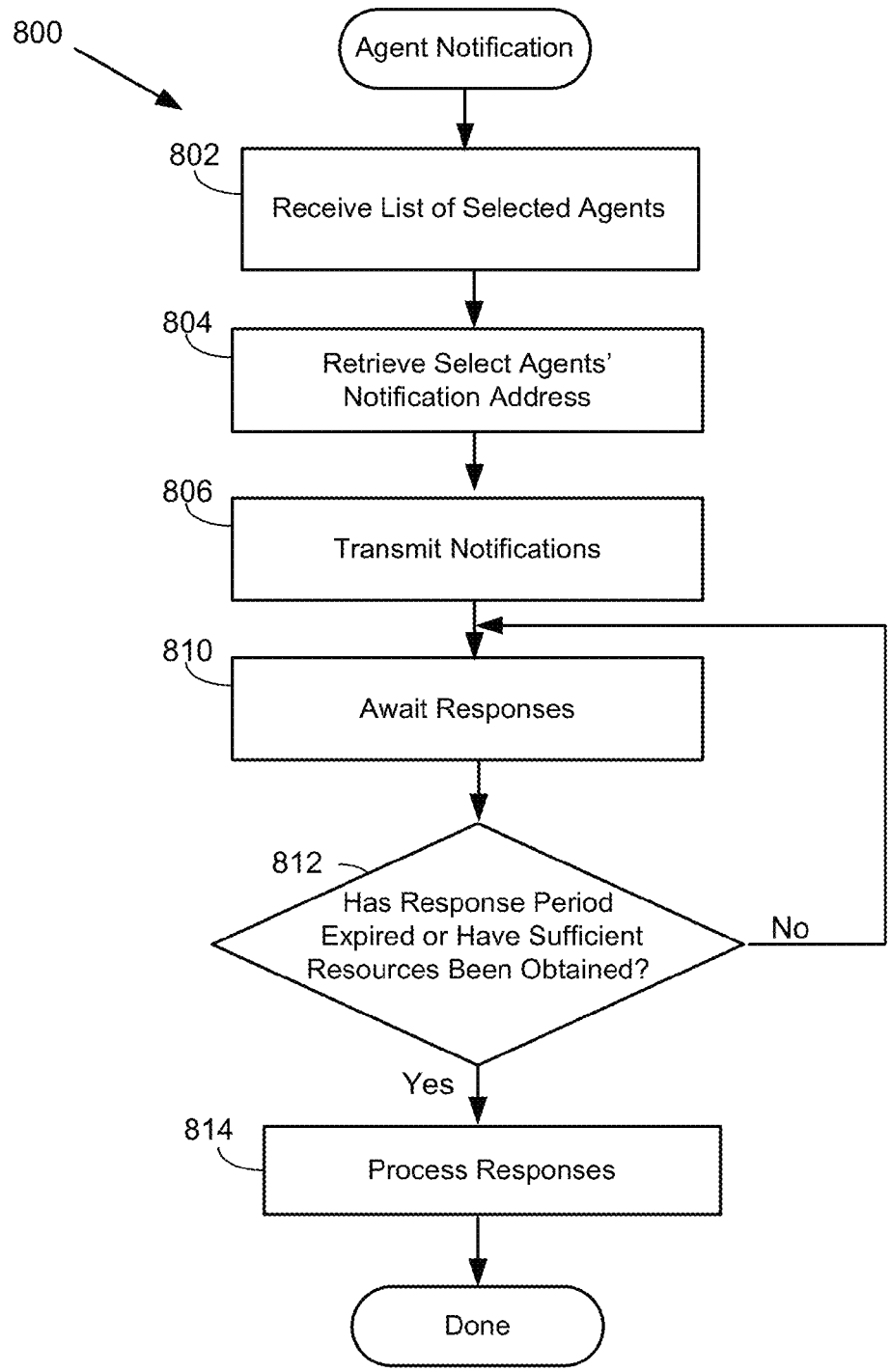
FIG. 8 illustrates one embodiment of an agent notification process flow.

As evident, there are a number of combinations and techniques that can be used to inform the appropriate agents of the recall, solicit their responses, and analyze their responses with respect to any remaining resource need. One embodiment of the process flow for the notification process is shown in FIG. 8. It is presumed that the selected agents were based on a priority rule. This embodiment incorporates a parallel notification of the indicated agents. After a time window, the agent's responses are analyzed in priority order.

The process 800 begins with receiving the list of selected agents in operation 802, which is presumed to be ordered in terms of priority for this embodiment. Further, it is presumed that there are more potential agents available than there are needed. Text-based address information for the selected agents is retrieved in operation 804, although different agents may prefer to have different forms of notification sent to them. Next, the notifications are transmitted to the agents in operation 806. In this embodiment, the notifications are transmitted in parallel to all the agents in the list. Thus, even though the list was in order of priority, the notification is in parallel.

Responses are awaited in operation 810. The responses are not necessarily processed in real time as received. Failure to respond results in a presumption that the agent has declined the invitation. Agents may further explicitly accept or reject the invitation. In this embodiment, the responses are collected for a particular time period, or until sufficient agent responses have been received that meet the agent deficiency. Which operation is applied may depend on various factors in various embodiments. For example, if time is of the essence, responses could be analyzed on a first-come basis. Thus, in operation 812 a test determines whether the response period has expired or whether sufficient resources have been obtained. If the answer to both is "no," the process loops back to operation 810 to await and collect further responses.

If the time window has expired, or sufficient responses have been received to meet the agent deficiency, then the responses are processed in operation 814.

In this embodiment, the responses are analyzed using the agent priority indicated in the agent selection list. The highest priority agent's response is analyzed first. The reserve time associated with the agent is credited to the deficiency amount. For example, if the agent deficiency requires 3 agent-hours between 2:00 p.m. and 3:00 p.m., and the responding agent has indicated a reserve hour is available, then the pending deficiency amount is reduced to 2 agent-hours. The next highest priority agent's response is authorized, and if they accept, then the deficiency is reduced by the number of hours that the second agent can provide, and so forth. After the third acceptance, the deficiency is met. If there is a fourth agent's response, the response may not be needed since the deficiency between 2:00-3:00 p.m. may have been filled.

However, there may also be an agent resource deficiency between 5:00 p.m. and 6:00 p.m. that the fourth agent can fulfill. Thus, each response in priority is processed and the deficiency needs are updated before processing the next response. Once all the agent responses are processed, then the process 800 is completed.

Miscellaneous Capabilities

Status Summary

Once sufficient reserve agent resources have been obtained to meet the deficiency, various updating of schedules and systems occurs. Recall from FIG. 2 that a master schedule for each agent is maintained, where the master schedule stores both the primary schedule and the reserve schedule. The reserve schedule is the time that the agent has indicated as being potentially available to work. Once the agent accepts the invitation to work certain reserve times that reserve time is converted to working time. This time can also be referred to as "converted reserve time" or "recall time." The converted reserve time defines the agent's recall schedule, which are the times when the agent is expected to work during their off-hours. The master schedule notes the converted reserve time, which can be done in a number of ways. In one embodiment, that time could be indicated in the agent's master schedule as working time with an additional indicator signifying that the time is converted reserve time.

The updated master schedule is available for the agent's review using any of the existing tools provided by the contact center to the agent for reviewing the agent's schedule. In one embodiment, the agent could log into the portal 530 and review the reserve schedule stored in the reserve schedule database 510.

An administrator may also review a summary status after the agent notification process 800 has completed. The purpose of the summary status is to provide an administrator with an indication of whether sufficient reserve agent capacity was obtained to meet the deficiency. The summary status can be presented to the administrator in a variety of formats, and the format can be tailored to meet the purpose of the information to be conveyed. In one embodiment, there are several types of information that the administrator may find useful. First, the administrator may desire to know the nature of the agent resource deficiency that exists, as well as how it was determined. The administrator may be informed of the extent that agent resources found to be deficient and at what times. This may necessitate presenting the deficiency in terms of agent-hours at certain times, using minimum incremental reporting periods. Further, the administrator may desire to know on what basis the deficiency was reported. The administrator may then also view when reserve times are available and to what extent that sufficient agents have been recalled to meet the deficiency.

Figure 9:
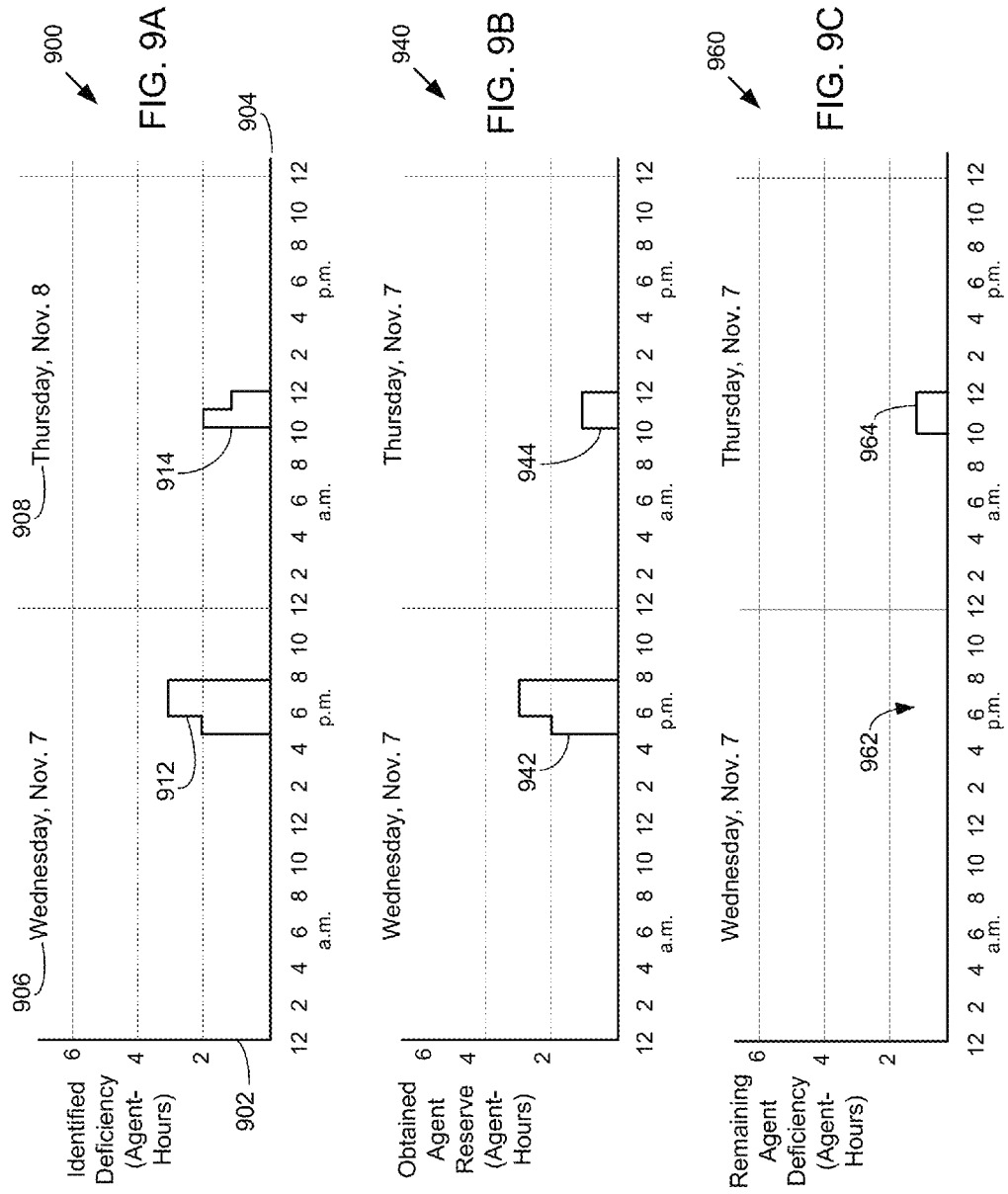
FIGS. 9A-9C illustrate one embodiment of indicating required agent resources, obtained agent resources, and a remaining agent deficiency.

One graphical format for presenting this uses a timeline specifying the resource deficiency over a forecasted time period, as shown in FIG. 9A. This timeline 900 illustrates resource deficiencies over a two day period 906, 908, namely Wednesday, November 7 and Thursday, November 8. This could be, e.g., the result of the deficiencies determined for the schedule for the upcoming week. Other formats may be presented on a weekly basis.

The vertical axis 902 represents the agent-hours in the identified deficiency, and the horizontal axis 904 represents time. The granularity of the time period is marked in two hour increments, but the resource deficiencies are determined and reported on an hourly basis. Other embodiments may report the deficiency on a 30 minute, 15 minute, or other time period. Although a shorter reporting period provides a more granular representation of the time deficiencies, the same reporting period may be used for requesting agent resources. A balance must be struck between the two, since agents may not be willing to be recalled for very short time periods.

In FIG. 9A, a first deficiency 912 is reported on Wednesday for 5:00 p.m. to 8:00 p.m., and a second deficiency 914 is reported on Thursday between 10 a.m. and 12 p.m. Specifically, the first deficiency 912 reports a deficiency of two agent-hours between 5:00-6:00 p.m., and a three agent hour deficiency between 6:00 and 8:00 p.m. The second deficiency 914 involves two agent hours between 10:00-11:00 a.m., and one agent-hour between 11:00 a.m. and 12:00 p.m. Thus, FIG. 9A provides a quick reference of when and to what extent agent deficiencies exist.

FIG. 9B provides a time 940 with a similar indication of the result of committed agent reserve hours. In this case, the first line graph 942 indicates agent reserve hours that were obtained between 5:00-8:00 p.m. on Wednesday. In this embodiment, two reserve hours were converted to working time between 5:00-6:00 p.m. and three reserve hours were converted between 6:00-8:00 p.m. The second line graph 944 indicates the agent hours obtained between 10:00 a.m.-12:00 p.m. on Thursday, which is one hour.

FIG. 9C provides a timeline 960 for the remaining or net result of the agent deficiency. In this case, there is no line graph in area 962, which shows that the obtained agent resources have completely met the deficiency—hence the remaining deficiency is zero. However, the line graph 964 for Thursday shows that there is a one agent-hour deficiency remaining between 10:00 a.m.-12:00 p.m. In other embodiments, an over capacity of obtained reserve hours could be indicated as well. Such areas could be highlighted to bring them to the attention of the administrator.

In some embodiments, the graphs may be overlayed, represented using different colors, or can be selected for individual viewing by the administrator. This allows the administrator to easily ascertain where the deficiencies were determined, what reserve capacity was found, and where there is a remaining deficiency. Other embodiments may also provide reports in a tabular form, a listing of reserve agents that committed reserve time, or those agents having available reserve time but did not commit.

Manual Overrides

The administrator may have capabilities to manually override the reserve schedule and/or to initiate recall invitations. In one example, which continues with the scenario described in conjunction with FIG. 9C, the administrator can determine that agent resources are still required for Thursday between 10:00 a.m. and 12:00 p.m. Specifically, a single agent-hour is required for this time.

The administrator may access the portal to review the reserve schedules for the various agents. Alternatively, the administrator could "mouse-over" the cursor over the line graph 964 to see a list of agents which have indicated available reserve time. The list may indicate which agents have committed reserve time, and which agents have not. This allows the administrator to contact or discuss with the agents who have not committed reserve time whether they can commit reserve time to meet this need. If the administrator has found an agent who is willing to commit reserve time, then appropriate interfaces are provided to allow the administrator to manually schedule the agent for this time.

In another embodiment, the administrator could manually initiate an invitation to agents (either those with available reserve time or all agents, even if they have not indicated any reserve time) and request that the agents assist by accepting the invitation for the remaining hour.

In one embodiment, the administrator could simply schedule the agent for conventional scheduled work time for the deficient time, bypassing the recall invitation process. In another embodiment, the administrator can record that an agent who has responded as having contributed reserve time for the required time. This allows the agent to receive appropriate credit (however this is defined) for working reserve time.

Incremental Pay Adjustments

In some embodiments, reserve time may be associated with additional pay provided to the reserve agent. The additional pay can function as an incentive for reserve agents to accept recall invitations. The additional pay can be determined in a variety of ways, including by defining a multiplier that increases the base pay of the agent for the reserve time, or by defining a fixed flat rate bonus for reserve time. The level of the increment and form of incentive can vary, based on the reserve time period. For example, reserve times that are less likely to be accepted or have fewer agents eligible to accept may have a higher multiplier than reserve times that are more likely to be accepted.

Once an agent accepts an invitation, the reserve time that is converted to working time is noted, and the appropriate payroll management systems are informed, so that the correct pay can be calculated for the reserve agent.

In some embodiments, agents may be expected to accept a minimum number of recall invitations per month or convert a minimum number of reserve hours per month. Thus, an agent may be required to accept recalls at a conventional base rate, and only receive the incremental rate when the minimum level of recalls are exceeded.

Agent Notification of Resource Deficiencies

It is possible that under various conditions, an anticipated agent resource deficiency will not be filled. For example, when the time periods and the level of an agent deficiency are determined, there may not be any reserve times indicated in the reserve schedule, or an insufficient number of reserve hours. The RAMS may initiate a broadcast message to the agents, indicating that there is an unfulfilled agent resource need at certain times. This message may also indicate a link to access the portal 530 for reviewing and managing the reserve schedules. The message could also indicate an incremental pay rate for this time period as an incentive for agents to respond.

In response, agents could access their reserve schedule and indicate the corresponding time period (or a subset thereof) as reserve time. The RAMS could then subsequently issue another recall invitation to the agents having the corresponding time period. Alternatively, the RAMS could monitor the reserve schedule, and as an agent changes their reserve time to fit the unmeet need, the agent's reserve hours are processed with respect to the deficiency.

Figure 11:
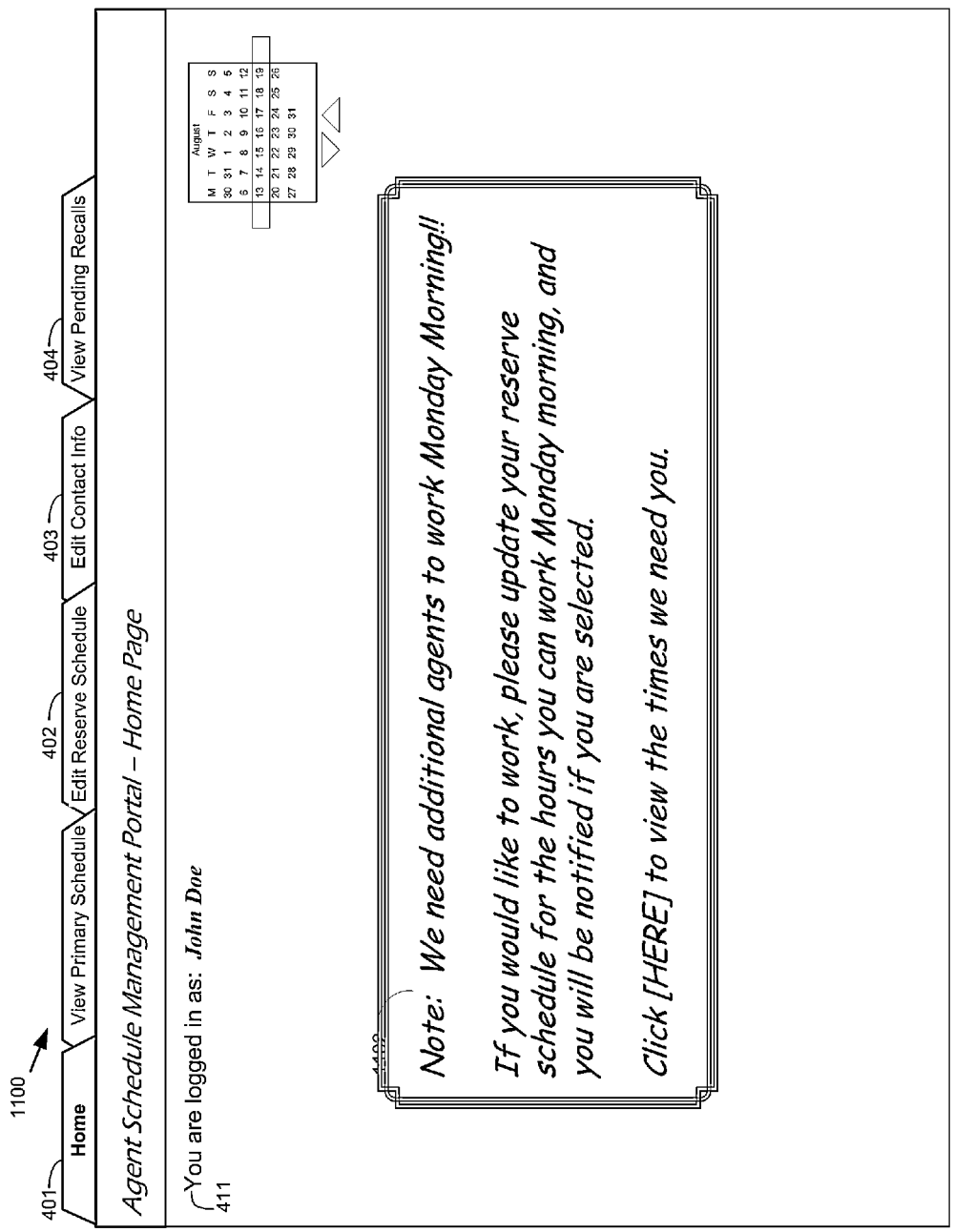
FIG. 11 illustrates one embodiment of a graphical user interface for informing agents of additional recall opportunities.

One approach for informing agents can be via the home page of the portal 530 which an agent can access for managing their reserve schedule. After logging in, a home page 1100 as shown in FIG. 11 can be presented to the agent. A notice 1102 can be prominently presented to all agents, indicating a need for agents at a certain time. The notice 1102 indicates when additional agents are required, and may indicate the specific time periods. In other embodiments, the agent could be presented with a link to view the specific times. This latter embodiment allows a large number of time periods to be viewed. The agent can then select the tab 402 for editing their recall schedule, and can be presented an indication of their current reserve schedule. The agent may be notified whether they are recalled, or a subsequent invitation may be transmitted to the agent.

Dynamic Determination of Reserve Time Pay

In some embodiments, there may be a plurality of agents, or a lack of agents, who are invited to become recalled agents. In such circumstances, the response from the agents (or the lack thereof) can be accommodated by accordingly adjusting the incremental pay associated with the reserve time. For example, a lack of agents responding to an invitation may result in re-inviting agents but at a higher incremental rate. Alternatively, it may be known that a large number of eligible agents are to be invited, and that a plurality of positive responses are expected. In this case, the invitation may be transmitted with a qualifier that no incremental pay rate will be paid, but that the pay will be at that agent's normal pay rate.

Figure 10:
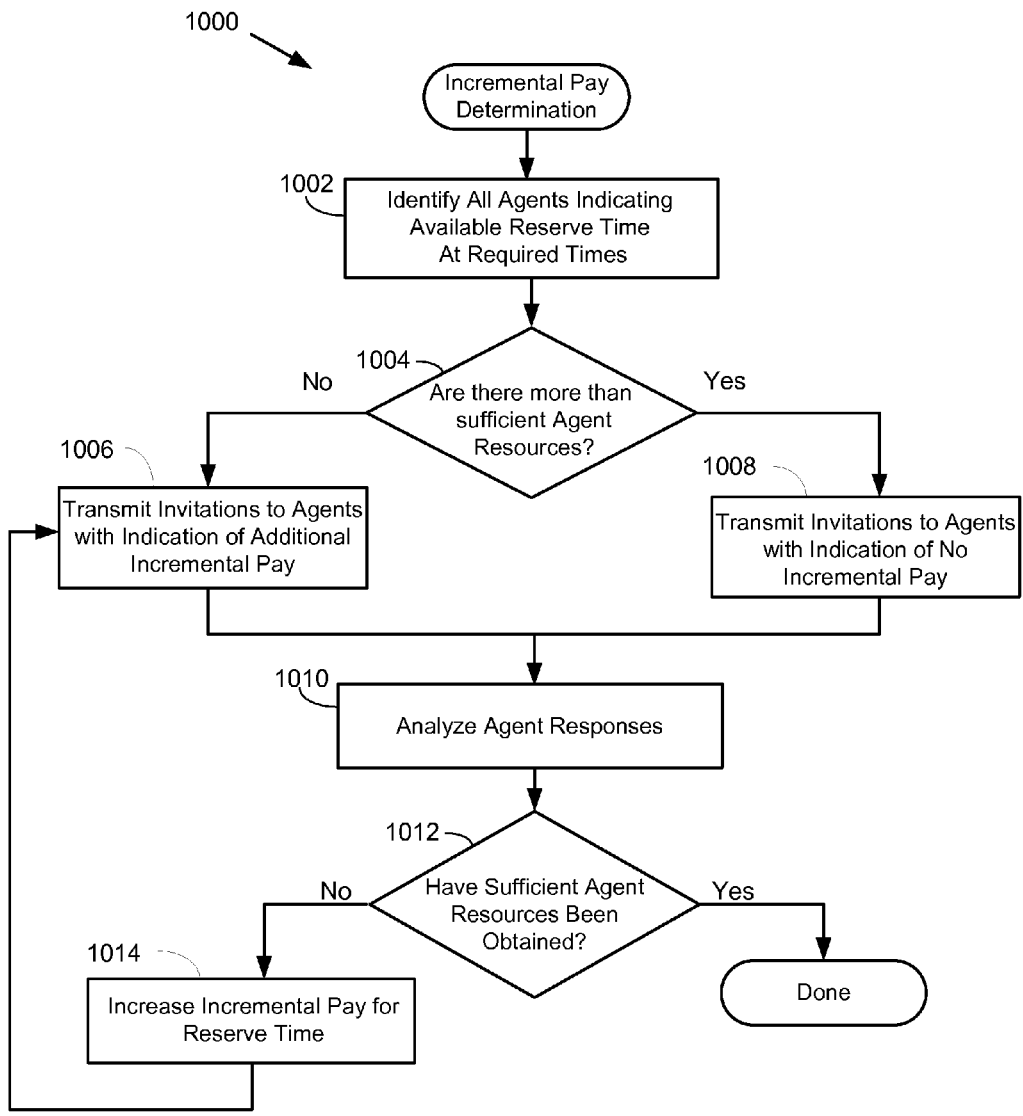
FIG. 10 illustrates one embodiment of a process flow for determining incremental pay.

One embodiment of dynamically adjusting the reserve time pay is shown in FIG. 10. FIG. 10 illustrates a process 1000 for accommodating for either a lack of responses, or an expected plurality of responses. The process begins with identifying the agents that have available reserve times that match the required times in operation 1002. This is determined by accessing the reserve schedules and searching and identifying all the agents who could contribute to the deficiency. For each applicable time slot, a determination is made whether there are more than sufficient agent resources in operation 1004. In one embodiment, this is made for each time period which is used for scheduling agents. This can be determined in one embodiment by multiplying the number of agents by an expected response probability. For example, if ten agents have reserve times indicated in their respective reserve schedules for a given time period, and past history suggests that a certain threshold will respond (e.g., 30%), then it can be predicted at least three responses can be expected. However, in other time periods, there may only be one agent who is eligible. Given a 30% response expectation, it may be deemed that there is an insufficient number of agent resources.

If in operation 1004 there is expected a sufficient number of agent resources to transmit notifications to, then in operation 1008 the invitations may be extended to the agents with an indication that no incremental reserve time pay is involved. If, on the other hand, in operation 1004 there is an insufficient number of agent resources expected to respond to meet the demand, then the invitations may be extended to agents with an indication of additional incremental pay in operation 1006.

In operation 1010, the agent responses are analyzed. These are processed in operation 1012 to determine whether sufficient agent responses have been obtained. If so, then the process has completed. If not, then in one embodiment the incremental pay for the reserve time is increased in operation 1014, and the process loops back to operation 1006 with the agents informed of the incremented additional pay. This looping process functions as a form of bidding, where the incremental pay offered is increased to entice an agent into accepting the offer.

Break Shifting

In some embodiments, depending on the size of the agent deficiency and the number of agents, the deficiency may be addressed by rearranging existing breaks of the agents. This may also involve cancelling training. This method of addressing the deficiency is called "break shifting" and does not involve recalling agents from their off-hours. Further, since the breaks occur during the agents' regularly scheduled shifts, no reserve hours are consumed to adjust the agent resources, and there may not be any incremental pay involved.

Break shifting may occur in one embodiment by the contact center notifying the agent of an updated primary work schedule. There may be limits as to how much breaks can be shifted or adjusted, but typically doing so within 15 or 30 minutes may be acceptable in various embodiments. In these embodiments, the process may not involve transmitting any invitations, but merely transmitting the updated primary work schedule to the agent with a notification that a shift in the break should be noted.

For example, a communication such as a text message or email message could be sent to the impacted agents indicating that a change in their schedule has occurred. In some embodiments, the impacted changes could be summarized. For example, the message could indicate: "Notice—your schedule for Wednesday, August 15 has changed. You now have your lunch break scheduled for 12:30 p.m. You can visit your schedule at [web link address]."

Thus, in various embodiments, the information transmitted to an agent could be a notification (without an opportunity for the agent to accept or reject) of a schedule change or of a recall, or the information transmitted to the agent could be a request for the agent to accept a recall, which does offer an opportunity for the agent to accept or reject the recall. As used herein, an "invitation" refers to information transmitted to the agent regarding a recall in regard to an agent resource deficiency that allows the agent to confirm acceptance of the recall, whereas a "schedule change report" refers to information informing the agent of a schedule change without any opportunity to reject.

Minimum Time Blocks

In many embodiments, there may be a minimum time block defined for scheduling agents for working time periods and another for indicating reserve times. In some cases, these minimum time blocks may be different. For example, an agent may be scheduled to the nearest 15 minute interval for their normal work shifts. However, it may be difficult to schedule reserve agents in 15 minute intervals for reserve time. For example, agents may be unwilling to interrupt their off-day to work a 15 minute interval.

Thus, even though reserve time may be indicated in 15 minute intervals, it may be necessary to define minimum allocated reserve time. This may be, e.g., a minimum of 30 or 60 minute minimum time blocks. Thus, an agent may indicate they can work from e.g., 2:00-5:00 p.m. Saturday afternoon, but is allocated a minimum of a single hour reserve time, with additional amounts in 15 minute increments. These parameters are usually defined by the application program defining the reserve agent management process. Other embodiments may employ rules indicating different minimum allocated times, depending on the circumstances. For example, an agent extending an existing work shift may agree to accept an invitation for reserve time in 15 minute increments, whereas an agent working reserve time on their day off may require a minimum one hour allocation of reserve time.

In other embodiments, when the agent accepts an invitation, the response may be qualified to further limit the needed time. For example, a recall invitation may be sent to an agent indicating a need for two hours (e.g., from 5:00 p.m. to 7:00 p.m.). The agent may respond by indicating that one hour (e.g., from 5:00 p.m. to 6:00 p.m.) can be provided. The RAMS may accept this response and attempt to have another reserve agent fulfill the remaining hour. Typically, the response will require a minimum time, plus increments of the minimum period e.g., a response may require at least an hour, and multiples of 30 minutes thereafter. An agent could then respond to this invitation by agreeing to work 1 hour, 1 hour and 30 minutes, or the full 2 hours.

Agent Reneging/Re-Notification

In some embodiments, an agent who has accepted an invitation to work off-hours may change their mind and renege. For example, an agent who is normally off each Saturday has accepted an offer to work Saturday afternoon. However, for various reasons, the agent is no longer able to work Saturday afternoon as originally indicated. In this embodiment, the agent is able to log onto the portal 530 and select a function allowing the agent to renege on their recall schedule commitment. A reason may be indicated, such as the agent is sick, their off-hours schedule has changed, etc.

In response, the portal may re-initiate the process for determining whether other agents are available for the indicated reserve time. A subsequent re-invitation may occur, which follows the process as described above. The portal may act in response to receiving a renege request from an agent by lowering an acceptance rating or priority rating of the agent. These may be used when allocating reserve time in future requests. As shown in FIG. 4, an agent may have a priority rating 432 and/or an acceptance rate 430 which is used to determine whether the agent or another agent should be invited for recall. An agent who frequently reneges on recall acceptance may have their rating decreased, so that next time the agent may not be contacted or may have a lower priority with respect to other agents. In some embodiments, an agent may be allocated a fixed number of renege allowances before their rating is decremented. For example, an agent may be allocated a single renege allowance after which their rating is reduced or downgraded. This serves as a mechanism for eliminating agents who are quick to accept invitations, but habitually then change their mind.

The impact of reneging is related also to how close to the reserve time that the agent reneges. Providing several days notice may allow the contact center to successfully rebid the reserve time, whereas reneging on the day of the reserve time may be difficult, and require the contact center to increase the incremental pay to obtain sufficient agent resources on short notice. The rating downgrade may also take into account when the agent reneges relative to when the reserve time is required.

Reserve Time Credit Hours

In some embodiments, an agent may agree to be recalled for a set time in exchange for a corresponding reduction of hours during their regularly scheduled shift. In other words, an agent may agree to work reserve hours with the understanding that this time functions as a credit that can be applied to some other regularly scheduled hours (either hours which should have been worked in the past, but were missed, or hours in the future which are scheduled to be worked). For example, an agent may know that they have a doctor's appointment the following week and expects to miss two hours of work. The agent may agree to work two additional hours after their shift today (or any other day in the current week) if the reserve time can be applied for the following week.

Applying a credit to reserve hours allows an agent to "balance" out the hours worked during a pay period (e.g., every two week) so that a relatively steady amount of hours are worked by the agent. The agent can maintain a degree of control over their own work schedule by accommodating the occasional events that may cause a conflict with their work schedule. Returning to the above example, an agent may receive their work schedule for the next two weeks, and then afterwards discover a conflict with the following week for their doctor's appointment. The agent could inform the administrator, and the administrator could re-run a schedule for all the contact center agents. This new schedule would take into account the agent's planned two hour absence. However, having the administrator repeatedly performing this each time an agent expects a minor modification to their schedule may be burdensome and resource intensive. For example, re-running a new schedule and then distributing the new schedule to all the contact center agents would be disruptive as all the agents would then have to review their individual schedules for changes, and the agent scheduled to fill the missing time slot may then have conflicts. This could result in the whole process being repeated a number of times.

In one embodiment, the administrator may review available reserve times in a reserve schedule and manually issue an invitation to potentially available reserve agents to work the additional two hour window. Provided an equally skilled agent is able to agree to work the reserve time, the net impact to the contact center operations are minimized. The schedule change involves only the two agents, and there is no need to rerun the primary schedules for all the agents in the contact center.

In some embodiments, the agent requiring a planned absence or tardiness ("Agent A") can negotiate individually with another agent ("Agent B") to cover the missing time for Agent A. Once such agreement is reached, Agent B can review their reserve schedule and indicate to the portal 530 that they are willing to work that time period (at the time period indicated by Agent A to Agent B). Essentially, Agent B indicates that time as reserve time on their schedule. At that point, Agent A knows that if the administrator then issues a manual invitation for that reserve time, an invitation will be sent to Agent B, and Agent B has agreed to accept that invitation. Thus, Agent A can facilitate finding a replacement for the required time without causing an unnecessary burden on the administrator or the operation of the contact center. Agent A can, in turn, agree to pick up an additional two hours if the opportunity presents itself, or use a credit previously established.

The indication of whether recall time is an addition to the agent's schedule, or to be credited against future time on the agent's schedule, may be made in various ways. In one embodiment, the agent may indicate via a checkbox in the response how they would like the recall time to be accounted for. Other controls may be defined that limit certain agents to certain options. For example, senior agents may be offered the flexibility, whereas junior agents may not be. Or, part-time agents may have the flexibility, whereas full time agents do not have the flexibility. This would allow full time agents to accept recall opportunities and have future time credited, so the contact center operator can avoid the requirement to pay overtime pay.

Treatment of Unreliable Reserve Agents

For the RAMS to function effectively, it is important that agents who indicate a willingness to be recalled during reserve times have a fair likelihood, if asked, to commit to being recalled. It is expected that in many instances, reserve agents when asked to be recalled may be unable to commit. The likelihood depends on various factors, including how far in advance they are invited to be recalled, the time when they are recalled, etc. However, an agent who continually declines invitations during their indicated reserve times is termed as an "unreliable reserve agent." The exact determination of when this level is reached varies from embodiment to embodiment.

A large inventory of reserve times in reserve schedules associated with unreliable reserve agents presents a misleading indication to the administrator of the status of available reserve time. Agents who continually decline recall invitations may see a reduction of future invitations as reflected by a reduced acceptance rate. An acceptance rate of 5% may reflect that the agent has only accepted 1 of 20 invitations. This affects the process of extending invitations to unreliable reserve agents, but does not alter the indicated times on the agent's reserve schedule. When an administrator reviews the indicated reserve times in the master schedules, the presence of a large portion of unreliable reserve times can indicate a misleading indication of the inventory of available reserve times.

In one embodiment, a process in the portal 530 may periodically review reserve schedules and cull or remove reserve schedules from agents who have a very low acceptance rate. Removal of such schedules may present to the administrator a more accurate picture of the inventory of reserve times. This process may motivate an agent to reflect a more accurate indication of reserve time that can be accepted by the agent, rather than broadly defining all of their off-hours as reserve time.

Automatic Recall of Agents

Agents scheduled for certain shifts are expected to log into the call handling system at their allocated times. An agent that fails to log-in will be detected by the call handling system, and the WFM may be notified so that an appropriate schedule adherence rate of the agent can be updated. In summary, the WFM is aware when an agent is not logged in relative to a schedule of when the agent should be logged in.

In these cases, the WFM may initiate an agent recall based on the assumption that the agent will be late, or will not show up at all. In such instances, the WFM may examine the reserve schedule database and determine whether there are any reserve agents that could be recalled. The WFM can then automatically recall agents as previously disclosed in order to fill an agent "no-show" condition.

In other embodiments, the WFM may expect an agent to log in at a certain time, either at the indicated work time, or within +/−10 minutes of that time. If no agent log-in is detected, then the WFM could initiate a text message, email message, or voice call using an automated system to contact the agent to ascertain whether the agent is merely running late, or will not show up at all for their shift. The WFM can use the response (or lack thereof) to appropriately schedule another agent for additional reserve time. For example, if the agent is merely running late, the WFM could contact reserve agents for an additional hour, but if the agent is unable to show up to work at all, or does not respond to the inquiry, then the WFM could contact one or more reserve agents to cover for that agent's entire shift. In some embodiments, depending on the circumstances of the need for the agent recall, different rules could be applied for prioritizing which agents are recalled. For example, if agents are sick and unable to show up, the requirement for locating a suitable recall agent may be modified; e.g., criteria with respect to pay rate, seniority, skill set, etc. normally applied for recalling agents may be waived or altered in order to find suitable agent resources to cover the absent agent. In other words, the urgency of the need for agent recall can impact the rules for selecting which agents to recall.

Exemplary Computer Processing Device

Figure 12:
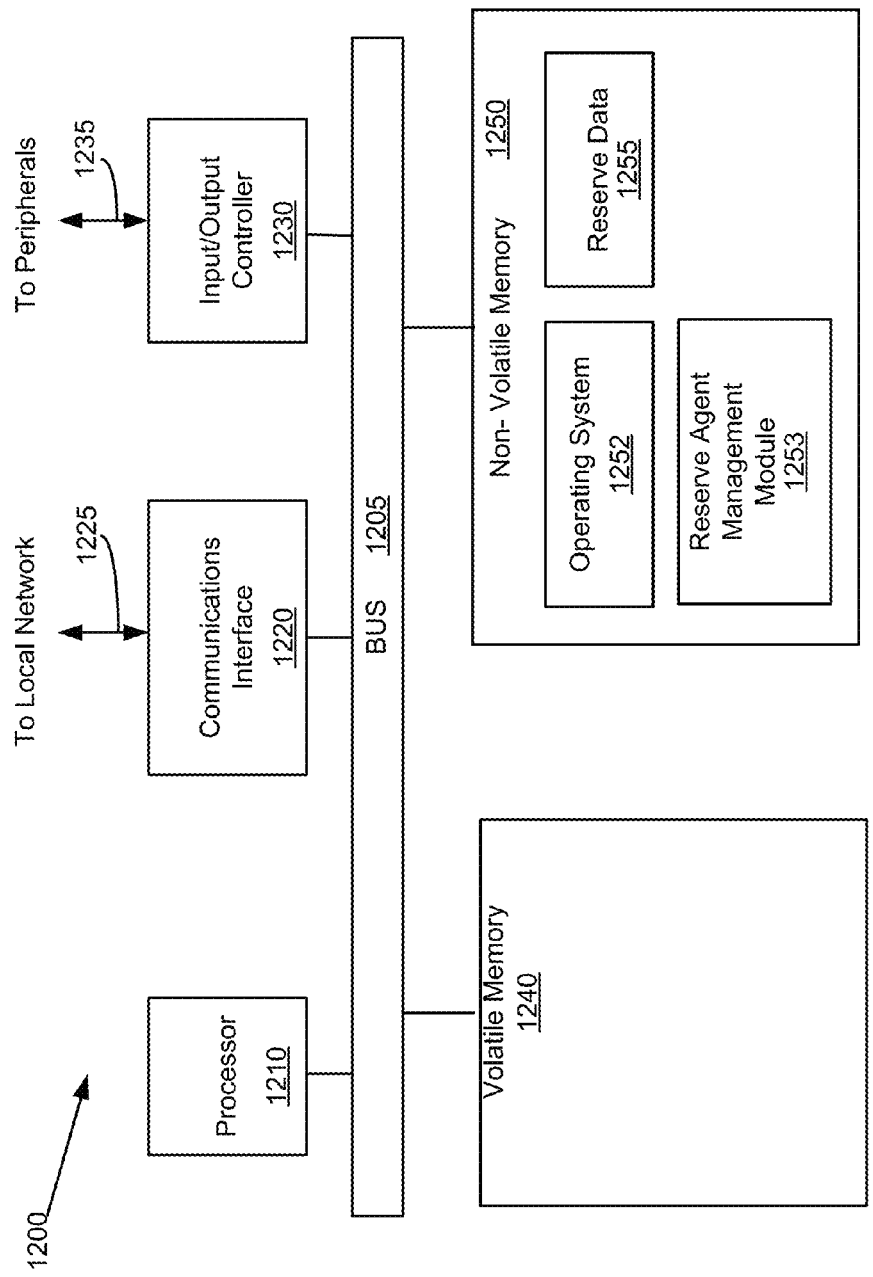
FIG. 12 illustrates one embodiment of a processing device for practicing the technologies and concepts herein.

FIG. 12 is an exemplary schematic diagram of a computer processing system that may be used in an embodiment of the contact center architecture to practice the technologies disclosed herein. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 12, the processing system 1200 may include one or more processors 1210 that may communicate with other elements within the processing system 1200 via a bus 1205. The processor 1210 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1200 may also include one or more communications interfaces 1220 for communicating data via the local network 170 with various external devices, including those shown in FIG. 1. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1230 may also communicate with one or more input devices or peripherals using an interface 1235, such as, but not limited to: a keyboard, a mouse, a touch screen/display input, microphone, pointing device, etc. The input/output controller 1230 may also communicate with output devices or peripherals, such as displays, printers, speakers, headsets, banner displays, etc. These may be used, in part, to receive Administrator input, including for interacting with the manual agent selection module.

The processor 1210 may be configured to execute instructions stored in volatile memory 1240, non-volatile memory 1250, or other forms of computer readable storage media accessible to the processor 1210. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1250 may store program code and data, which also may be loaded into the volatile memory 1240 at execution time. Specifically, the non-volatile memory 1250 may store one or more reserve agent management modules 1253 that may perform the above mentioned process flows and/or operating system code 1252 containing instructions for performing the process and/or functions associated with the technologies disclosed herein. The reserve agent management modules 1253 may also access, generate, or store the various schedules and related reserve time data 1255, including the data described above in conjunction with selecting agents, storing processing rules, etc., in the non-volatile memory 1250, as well as in the volatile memory 1240. The volatile memory and/or non-volatile memory may be used to store other information including, but not limited to: records, applications, programs, scripts, source code, object code, byte code, compiled code, interpreted code, machine code, executable instructions, or the like. These may be executed or processed by, for example, processor 1210. These may form a part of, or may interact with, the dialing list processing module 1253.

The technologies described herein may be implemented in various ways, including as computer program products comprising memory storing instructions causing a processor to perform the operations associated with the above technologies. The computer program product may comprise a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A system for managing a reserve schedule for an agent in a contact center having currently scheduled work shifts during a particular time period, comprising:
    a data store storing
        a master schedule, wherein the master schedule delineates
            a first time period during the particular time period when the agent is unavailable to be recalled,
            a second time period during the particular time period comprising a reserve time period indicating when the agent is potentially available to be recalled, and
            a third time period during the particular time period when the agent is scheduled to work,
        wherein the master schedule further comprises
            a primary schedule associated with the agent indicating the currently scheduled work shifts of the agent during the particular time period, and
            the reserve schedule associated with the agent, wherein the reserve schedule indicates for the particular time period the reserve time period outside the currently scheduled work shifts of the agent indicating when the agent is potentially available to be recalled to work between the currently scheduled work shifts; and
    a processor configured to
        receive an agent login from the agent,
        authenticate and identify the agent,
        retrieve the reserve schedule from the data store,
        transmit the reserve schedule to a processing device used by the agent,
        receive an update to the reserve schedule from the processing device,
        update the reserve schedule thereby creating an updated reserve schedule,
        transmit the updated reserve schedule to the processing device used by the agent,
        store the updated reserve schedule in the data store,
        determine an agent resource deficiency in the contact center comprising
            1) a quantity of agent resources required in the contact center, and
            2) an agent deficiency time period when the quantity of agent resources are required,
        determine the updated reserve schedule of the agent includes a time period coinciding with at least a subset of the agent deficiency time period,
        transmit a recall invitation to the processing device used by the agent,
        receive a response from the agent confirming acceptance of the recall invitation, and
        indicate at least a portion of the reserve time period of the agent is converted to work time.

2. The system of claim 1, wherein transmitting the updated reserve schedule to the agent further comprises transmitting an updated primary schedule to the agent.

3. The system of claim 1, wherein the processor is configured to receive the update from the agent comprising a specific time portion in the primary schedule identified as off-hours being indicated as reserve time, and the updated reserve schedule further indicates the specific time portion in the reserve schedule as reserve time.

4. The system of claim 1, wherein the processor is further configured to:
receive an administrator login of an administrator of the contact center;
authenticate and identify the administrator of the contact center;
present to the administrator a plurality of future reserve times associated with the agent and at least one other agent; and
indicate to the administrator at least one time period during the agent deficiency time period where an insufficient number of agent resources having available reserve times are available.

5. The system of claim 1, wherein the processor is further configured to:
provide an acceptance rate indication to the agent along with the reserve schedule, wherein the acceptance rate indication indicates a historical acceptance rate of prior recall invitations transmitted to the agent.

6. The system of claim 1, wherein the processor is further configured to:
provide to the agent a graphical image via a web page comprising
a first indication of the one or more work time periods,
a second indication of the reserve time period, and
a third indication of one or more off-hour time periods associated with an indicated day of week.

7. A method of maintaining a reserve schedule for an agent having currently scheduled work shifts during a particular time period, comprising:
providing a portal storing
a master schedule for the agent indicating a first time period when the agent is unavailable to be recalled and a second time period comprising a reserve time period indicating when the agent is potentially available to be recalled,
a primary schedule indicating a third time period comprising the currently scheduled work shifts of the agent for the particular time period, and
the reserve schedule of the agent, wherein the reserve schedule indicates for the particular time period the reserve time period outside the currently scheduled work shifts of the agent indicating when the agent is potentially available to be recalled to work between the currently scheduled work shifts, the portal capable of being accessed by the agent of a contact center;
receiving an agent login at the portal to authenticate and identify the agent at the portal;
retrieving the reserve schedule by the portal for the agent;
transmitting the reserve schedule by the portal to a processing device used by the agent;
receiving an update to the reserve schedule from the processing device used by the agent;
updating the reserve schedule thereby creating an updated reserve schedule;
transmitting the updated reserve schedule to the processing device used by agent;
determining an agent resource deficiency in the contact center comprising
1) a quantity of agent resources that are required in the contact center, and
2) an agent deficiency time period when the quantity of agent resources are required;
determining the updated reserve schedule of the agent includes a time period coinciding with at least a subset of the agent deficiency time period;
transmitting a recall invitation to the processing device used by agent;
receiving a response from the processing device used by the agent confirming acceptance of the recall invitation; and
indicating at least a portion of the reserve time period of the agent is converted to work time.

8. The method of claim 7, wherein transmitting the updated reserve schedule to the agent further comprises transmitting an updated primary schedule to a mobile processing device used by the agent.

9. The method of claim 8, wherein the update from the agent comprises a specific time portion in the primary schedule identified as off-hours indicated as reserve time, and the updated reserve schedule further reflects the specific time portion in the reserve schedule as reserve time.

10. The method of claim 7, further comprising the steps of:
receiving an administrator login of an administrator of the contact center at the portal;
authenticating and identifying the administrator of the contact center at the portal;
presenting to the administrator a plurality of future reserve times during the particular time period associated with the agent and at least one other agent; and
indicating to the administrator at least one time period during the agent deficiency time period where an insufficient number of agent resources having available reserve times are available.

11. The method of claim 7 further comprising the steps of:
providing an acceptance rate indication to the agent along with the reserve schedule, wherein the acceptance rate indication indicates a historical acceptance rate of prior recall invitations transmitted to the agent.

12. The method of claim 7 wherein the step of transmitting the updated reserve schedule to the agent further comprises:
providing to the agent a graphical image via a web page comprising
a first indication of one or more work time periods,
a second indication of the reserve time period, and
a third indication of one or more off-hour time periods associated with an indicated day of week.

13. A non-transitory tangible computer-readable storage medium comprising computer-executable instructions for causing a computer processor to:
receive an agent login from an agent of a contact center, wherein the agent has currently scheduled work shifts for a particular time period;
authenticate and identify the agent;
retrieve a reserve schedule for the agent stored in a data store;
wherein the reserve schedule is associated with the agent for the particular time period and indicates a reserve time period outside the currently scheduled work shifts of the agent indicating when the agent is potentially available to be recalled to work during times between the currently scheduled work shifts, and
wherein the data store further stores a master schedule indicating a first time period indicating when the agent is unavailable to be recalled and a second time period indicating the reserve time period when the agent is potentially available to be recalled, the data store further storing a primary schedule associated with the agent indicating a third time period comprising the currently scheduled work shifts of the agent during the particular time period;
transmit the reserve schedule to a processing device used by the agent;
receive an update from the agent to the reserve schedule;
update the reserve schedule thereby creating an updated reserve schedule;
transmit the updated reserve schedule to the processing device used by the agent;
determine an agent resource deficiency in the contact center comprising
  1) a quantity of agent resources that are required in the contact center, and
  2) an agent deficiency time period when the quantity of agent resources are required;
determine the updated reserve schedule of the agent includes a time period coinciding with at least a subset of the agent deficiency time period;
transmit a recall invitation to the processing device used the agent;
receive a response from the processing device used by the agent confirming acceptance of the recall invitation; and
indicate at least a portion of the reserve time period of the agent is converted to work time.

14. The non-transitory tangible computer-readable medium of claim 13, further storing instructions that when executed by the processor cause the processor to:
receive an administrator login of an administrator of the contact center;
authenticate and identify the administrator of the contact center at the portal;
present to the administrator a plurality of future reserve times associated with the agent and at least one other agent for the particular time period; and
indicate to the administrator at least one time period during the agent deficiency time period where an insufficient number of agent resources having available reserve times are available.

* * * * *